United States Patent
Aoki

(10) Patent No.: US 10,363,956 B2
(45) Date of Patent: Jul. 30, 2019

(54) STEERING CONTROL APPARATUS

(71) Applicant: DENSO CORPORATION, Kariya, Aichi-pref. (JP)

(72) Inventor: Takashi Aoki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 2 days.

(21) Appl. No.: 15/697,197

(22) Filed: Sep. 6, 2017

(65) Prior Publication Data

US 2018/0065660 A1    Mar. 8, 2018

(30) Foreign Application Priority Data

Sep. 7, 2016 (JP) .................................. 2016-174506

(51) Int. Cl.
*B62D 5/04* (2006.01)
*B62D 6/00* (2006.01)

(52) U.S. Cl.
CPC ......... *B62D 5/0466* (2013.01); *B62D 5/0409* (2013.01); *B62D 5/0463* (2013.01); *B62D 6/008* (2013.01)

(58) Field of Classification Search
CPC .. B62D 5/0466; B62D 5/0409; B62D 5/0463; B62D 6/008
See application file for complete search history.

(56) References Cited

U.S. PATENT DOCUMENTS

| | | | | |
|---|---|---|---|---|
| 2009/0266641 | A1* | 10/2009 | Ehara ................... | B62D 5/0466 180/446 |
| 2014/0129089 | A1* | 5/2014 | Takeuchi ............. | B62D 5/0466 701/41 |
| 2017/0166246 | A1 | 6/2017 | Gotou et al. | |
| 2017/0183028 | A1* | 6/2017 | Kitazume ............ | B62D 5/0466 |
| 2018/0065658 | A1 | 3/2018 | Aoki | |
| 2018/0065659 | A1 | 3/2018 | Aoki | |

FOREIGN PATENT DOCUMENTS

| | | |
|---|---|---|
| JP | 4959212 | 6/2012 |
| JP | 4959217 B2 | 6/2012 |

* cited by examiner

*Primary Examiner* — Calvin Cheung
(74) *Attorney, Agent, or Firm* — Knobbe, Martens, Olson & Bear, LLP

(57) ABSTRACT

In a return control unit, a driver steering correcting unit calculates a correction amount outputted in relation to any calculation quantity in a calculation process for a return control amount, based on a steering torque and steering wheel position-related information, such that the return control amount is maintained or increased when a steering torque is applied in a returning direction towards a neutral position of a steering wheel, and the return control amount is reduced when the steering torque of which an absolute value is equal to or greater than a predetermined critical value is applied in a turning direction away from the neutral position of the steering wheel. The steering wheel position-related information is information of which a value when the steering wheel is at the neutral position is zero and the value is positive or negative based on a steering wheel position in relation to the neutral position.

14 Claims, 17 Drawing Sheets

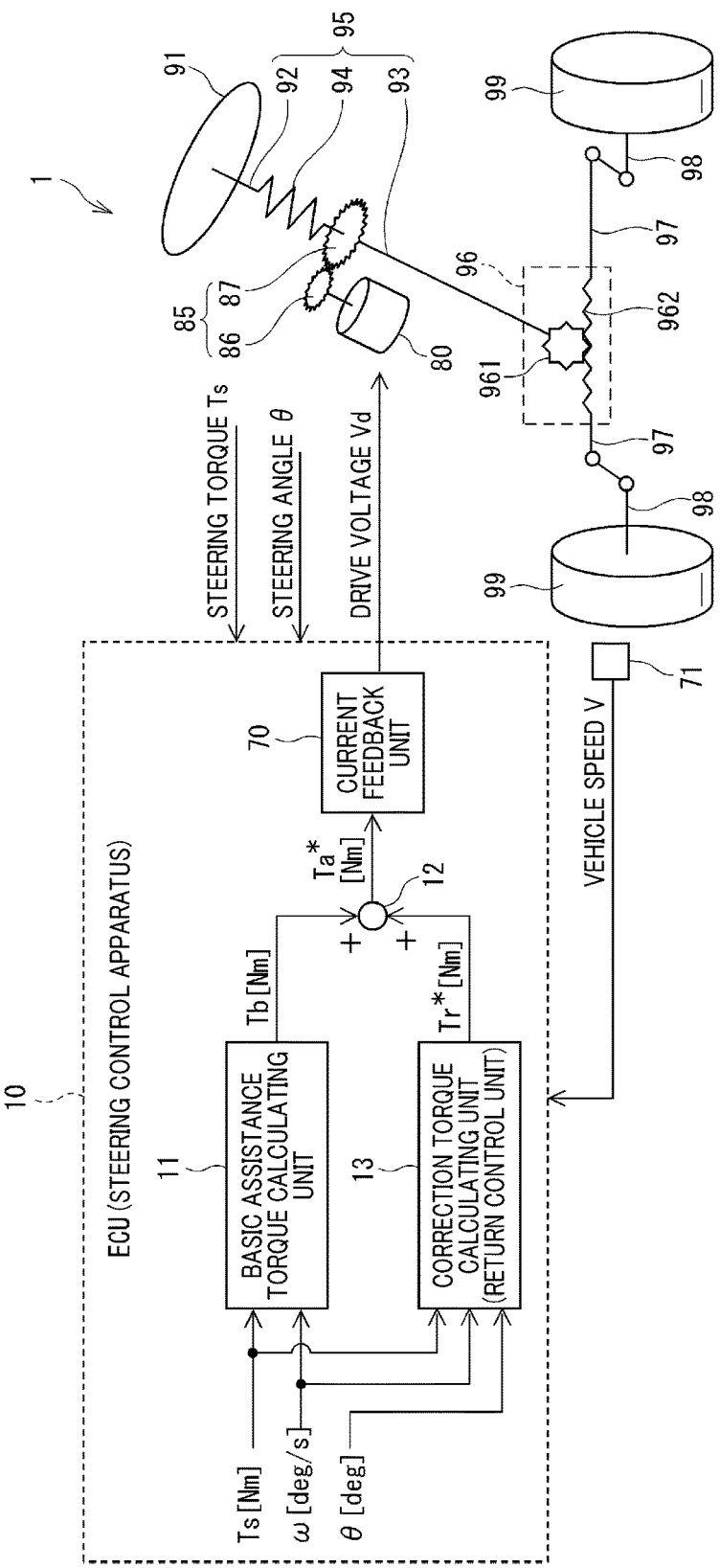

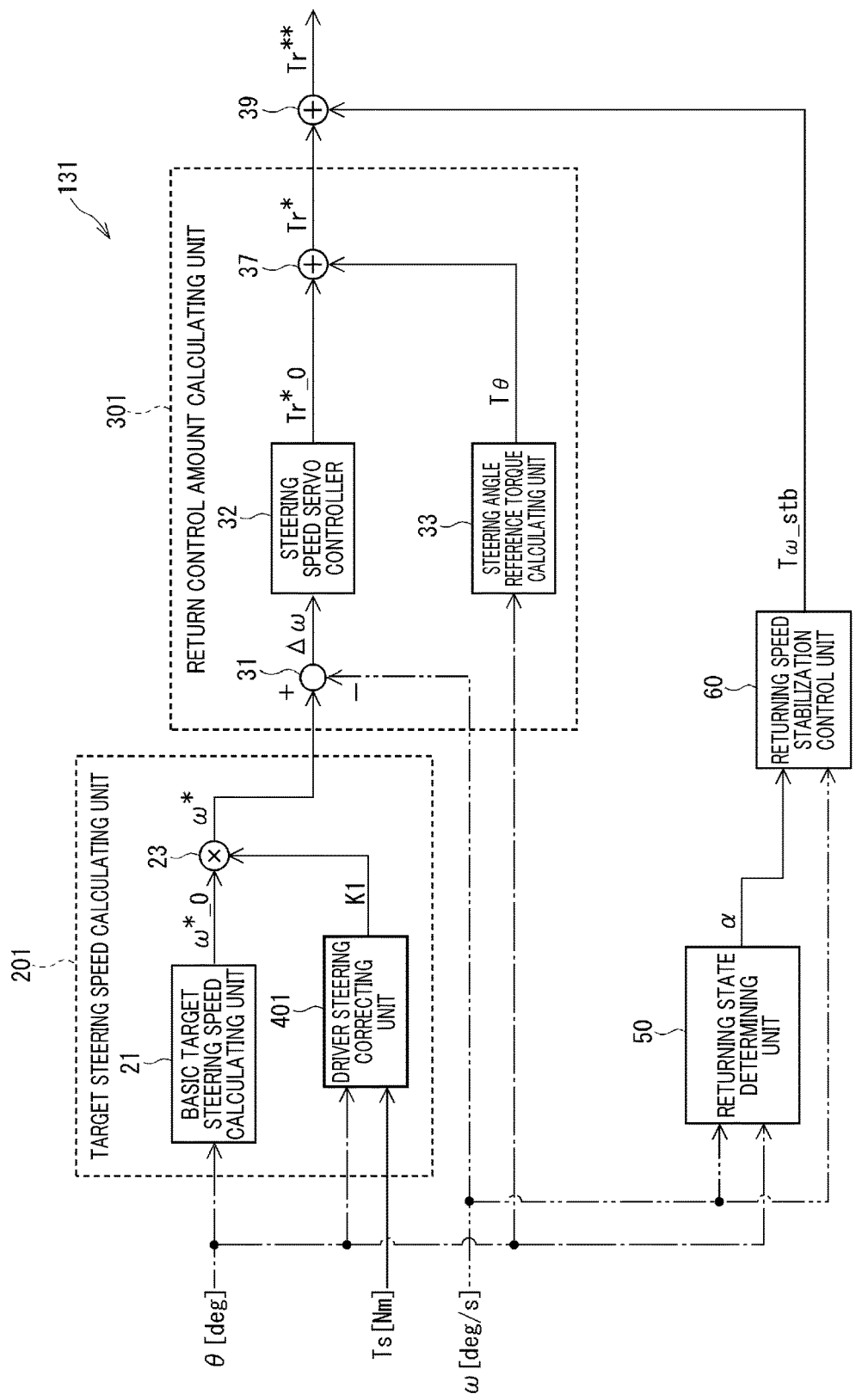

POST-SIGN MULTIPLICATION STEERING TORQUE Ts_sgn

STEERING CONTROL APPARATUS

CROSS-REFERENCE TO RELATED APPLICATIONS

This application is based on and claims the benefit of priority from Japanese Patent Application No. 2016-174506, filed Sep. 7, 2016. The entire disclosure of the above application is incorporated herein by reference.

BACKGROUND

1. Technical Field

The present disclosure relates to a steering control apparatus.

2. Related Art

In a low vehicle-speed range, the sideslip angle of a vehicle body or a tire is relatively smaller than that when the vehicle speed is high. At the same steering angle and lateral acceleration, a self-aligning torque received from a road surface is smaller in the low-vehicle speed range. When the self-aligning torque becomes about equal to or less than friction in a steering mechanism, the steering wheel does not easily return to a neutral position. Consequently, a driver is required to intentionally perform an operation to return the steering wheel to the neutral position. Therefore, a steering control apparatus that performs "return control" is known. In this return control, a correction torque in a direction in which the steering wheel returns to the neutral position is calculated and added to an assistance torque.

For example, Japanese Patent Publication No. 4959217 discloses an apparatus in which a following problem is considered. That is, when the return control is performed while a steering is held by a driver, it is difficult to stably perform steering at a small steering angle, and particularly at a low vehicle speed. Here, as a means for solving this problem, a gain is calculated such that the value of the gain is 1 when a steering torque is 0, and gradually approaches 0 as the steering torque increases from 0 in a negative or positive direction. The calculated gain is then multiplied with a return torque, and output from the return control when the steering is held is suppressed.

In the technology in Japanese Patent Publication No. 4959217, the output from the return control is also suppressed when the driver actively applies the steering torque in a returning direction. Therefore, a problem arises in that steering load placed on the driver increases.

SUMMARY

It is thus desired to provide a steering control apparatus that appropriately adjusts a return control amount based on steering by a driver during return control.

An exemplary embodiment provides a steering control apparatus that controls an assistance torque outputted by a steering assistance motor based on a steering torque applied by a driver. The steering control apparatus includes a basic assistance torque calculating unit that calculates a basic assistance torque and a return control unit. The return control unit calculates a return control amount for providing assistance such that a steering wheel returns to a neutral position, as a correction torque to be added to the basic assistance torque.

Here, "information of which a value when the steering wheel is at the neutral position is 0 and the value is positive or negative based on a steering wheel position in relation to the neutral position" is more simply referred to as "steering wheel position-related information." For example, when the steering wheel is positioned on the left side in relation to the neutral position, the value of the steering wheel position-related information is positive. When the steering wheel is positioned on the right side in relation to the neutral position, the value of the steering wheel position-related information is negative. The steering wheel position-related information includes, in addition to a steering angle that directly indicates a rotation amount of the steering wheel, information such as a motor rotation angle, a rotation angle of a transmission system gear, a steering angle of a tire, or a yaw rate that is correlated with the steering angle.

The return control unit includes a driver steering correcting unit that calculates a correction amount outputted in relation to any calculation quantity in a calculation process for the return control amount, based on the steering torque and the steering wheel position-related information. The correction amount is calculated such that the return control amount is maintained or increased when the steering torque is applied in a returning direction towards the neutral position of the steering wheel, and the return control amount is reduced when the steering torque of which an absolute value is equal to or greater than a predetermined critical value is applied in a turning direction away from the neutral position of the steering wheel.

That is, the driver steering correcting unit prevents increase in steering load or reduces steering load by maintaining or increasing the return control amount when the driver is applying the steering torque in the returning direction. In addition, the driver steering correcting unit reduces a sense of inhibited steering by reducing the return control amount when the driver is applying the steering torque in the turning direction. However, when the absolute value of the steering torque in the turning direction is small, the effect on steering need not be considered in some cases. Therefore, the return control amount is reduced when the absolute value of the steering torque in the turning direction is equal to or greater than the predetermined critical value. The critical value may, of course, be set to 0.

In the related technology in this previously mentioned Japanese Patent Publication No. 4959217, the output of the return control is suppressed even when the driver is applying the steering torque in the returning direction. Therefore, steering load becomes high. In this regard, in the present disclosure, the return control amount is at least not reduced when the driver is applying the steering torque in the returning direction. Therefore, steering feel can be improved. Consequently, the steering control apparatus of the present disclosure is capable of appropriately adjusting the return control amount based on steering by the driver.

The driver steering correcting unit preferably calculates the correction amount based on a post-sign multiplication steering torque obtained by the sign of the steering wheel position-related information and the steering torque being multiplied. Specifically, the driver steering correcting unit calculates the correction amount in the following manner, with reference to the return correction amount when the post-sign multiplication steering torque is zero and based on the definition of the signs of the steering torque.

When the signs of the steering torque are defined based on directions that are the same as the directions indicated by the signs of the steering wheel position-related information, the driver steering correcting unit maintains or increases the return control amount when the post-sign multiplication steering torque is negative, and reduces the return correction amount when the post-sign multiplication steering torque is positive and the absolute value thereof is equal to or greater than the predetermined critical value.

When the signs of the steering torque are defined based on directions that are opposite the directions indicated by the signs of the steering wheel position-related information, the driver steering correcting unit maintains or increases the return control amount when the post-sign multiplication steering torque is positive, and reduces the return correction amount when the post-sign multiplication steering torque is negative and the absolute value thereof is equal to or greater than the predetermined critical value.

BRIEF DESCRIPTION OF THE DRAWINGS

In the accompanying drawings:

FIG. 1 is an overall configuration diagram of an electric power steering system;

FIG. 3 is an overall control block diagram of a return control unit according to a first embodiment;

DESCRIPTION OF THE EMBODIMENTS

Figure 2A:
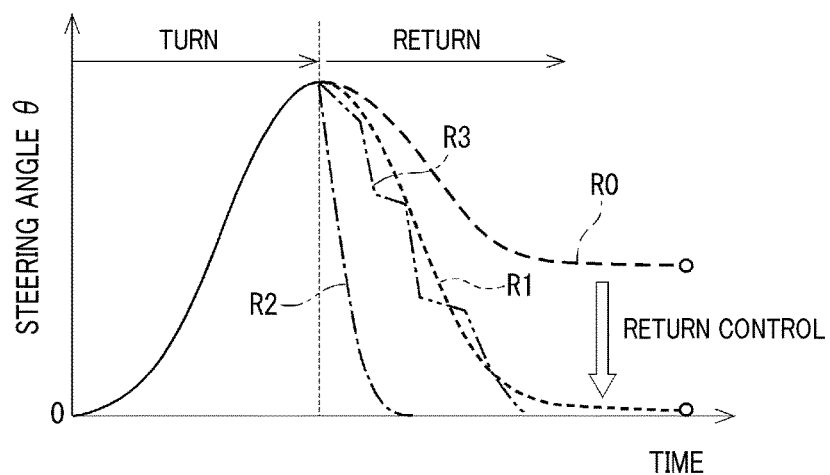
FIG. 2A is a diagram of changes over time in steering angle and FIG. 2B is a diagram of changes in state during transition from turn steering to return steering, in return control.

A plurality of embodiments of a steering control apparatus will hereinafter be described with reference to the drawings. According to each embodiment, an electronic control unit (ECU) serving as the "steering control apparatus" is applied to an electric power steering system of a vehicle. The ECU controls an assistance torque that is outputted from a steering assistance motor. In addition, in the specification, "present embodiment" collectively refers to first to fifth embodiments, described hereafter.

[Configuration of the Electric Power Steering System]

As shown in FIG. 1, an electric power steering system 1 assists a driver in operating a steering wheel 91 using torque from a steering assistance motor 80.

The steering wheel 91 is fixed to an end of a steering shaft 92. An intermediate shaft 93 is provided on the other end side of the steering shaft 92. A torque sensor 94 is provided between the steering shaft 92 and the intermediate shaft 93. An overall shaft from the steering shaft 92, through the torque sensor 94, to the intermediate shaft 93 is collectively referred to as a steering shaft section 95.

The torque sensor 94 detects a steering torque Ts that is applied to a torsion bar that connects the steering shaft 92 and the intermediate shaft 93, based on an angle of torsion of the torsion bar. A detection value of the torque sensor 94 is outputted to the ECU 10. A gear box 96 is provided in an end portion of the intermediate shaft 93 on the side opposite the torque sensor 94. The gear box 96 includes a pinion gear 961 and a rack 962.

When the steering wheel 91 is turned by the driver, the pinion gear 961 rotates together with the intermediate shaft 93. The rack 962 moves leftward or rightward in accompaniment with the rotation of the pinion gear 961. Tie rods 97 are provided on both ends of the rack 962. The tie rods 97 move leftward and rightward in a reciprocating manner, together with the rack 962. An orientation of a wheel 99 changes as a result of the tie rod 97 pulling and pushing a knuckle arm 98. In addition, a vehicle speed sensor 71 is provided in a predetermined section of the vehicle. The vehicle speed sensor 71 detects a vehicle speed V.

For example, the motor 80 is a three-phase brushless alternating-current motor. The motor 80 outputs an assistance torque based on a drive voltage Vd outputted from the ECU 10. The assistance torque assists with a steering force of the steering wheel 91. In the case of the three-phase alternating-current motor, the drive voltage Vd refers to a phase voltage of each phase, that is, a U phase, a V phase, and a W phase. Rotation of the motor 80 is transmitted to the intermediate shaft 93 via a reduction mechanism 85. The reduction mechanism 85 has a worm gear 86 and a worm wheel 87. In addition, when the intermediate shaft 93 rotates as a result of a self-aligning torque or road-surface reaction force from the wheel 99 side, the rotation is transmitted to the motor 80 via the reduction mechanism 85.

The electric power steering system 1 shown in FIG. 1 is a column-assisted type in which the rotation of the motor 80 is transmitted to the steering shaft section 95. However, the ECU 10 according to the present embodiment can be similarly applied to a rack-assisted-type electric power steering system or a steer-by-wire system. In the steer-by-wire system, the steering wheel and steered wheels are mechanically separated. In addition, according to another embodiment, a multiple-phase alternating-current motor that has a number of phases other than three, or a brushed direct-current motor may be used as the steering assistance motor.

The ECU 10 is operated by electric power received from an on-board battery (not shown). The ECU 10 calculates an assistance torque command Ta* based on the steering torque Ts detected by the torque sensor 94, the vehicle speed V detected by the vehicle speed sensor 71, and the like. Then, the ECU 10 applies the drive voltage Vd calculated based on the assistance torque command Ta* to the motor 80, thereby making the motor 80 generate the assistance torque. The various calculation processes performed by the ECU 10 may be software processes actualized by a central processing unit (CPU) running programs stored in advance in a tangible memory device, such as a read-only memory (ROM). Alternatively, the various calculation processes may be actualized by hardware processes performed by dedicated electronic circuits.

The ECU 10 includes a basic assistance torque calculating unit 11, a correction torque calculating unit 13, and a current feedback unit 70. The basic assistance torque calculating unit 11 calculates a basic assistance torque Tb based on the steering torque Ts and a steering speed ω. The correction torque calculating unit 13 calculates various types of correction torque to be added to the basic assistance torque Tb. However, according to the present embodiment, focus is placed only on a return control amount Tr* for return control, as the correction torque. Other types of correction torque will not be mentioned. Therefore, the "correction torque calculating unit" will specifically be described hereafter as a "return control unit 13."

The return control unit 13 calculates the return control amount Tr* based on the steering torque Ts, the steering speed ω, and a steering angle θ. An adder 12 adds the return control amount Tr* calculated by the return control unit 13 to the basic assistance torque Tb. The assistance torque command Ta* is thereby calculated. In addition, as shown in FIG. 3 and the like, in the case of a configuration in which another correction torque is further added to the return control amount Tr*, the return control amount Tr* in FIG. 1 is replaced by a return control amount final command value Tr**.

Units, such as [Nm], [deg], and [deg/s], that are used regarding various quantities serve to express dimensions of these quantities and are not intended to limit usage thereto. For example, [rad] may be used as the unit for angles. A similar interpretation also applies to the drawings hereafter. Furthermore, the terms "steering angle θ" and "steering speed ω" are used not only for cases in which the steering wheel 91 is rotated through active steering by the driver, but also in a broader manner to include the position and rotation speed of the steering wheel 91 in a state in which the driver has let go of the steering wheel 91.

The current feedback unit 70 performs feedback control of an actual current flowing to the motor 80 in relation to a target current based on the assistance torque command Ta*, and thereby calculates the drive voltage Vd applied to the motor 80. Configurations of the basic assistance torque calculating unit 11 and the current feedback unit 70 in the steering control apparatus are known technology. Therefore, detailed descriptions thereof are omitted.

[Overview of Return Control]

Next, an overview of the return control will be described with reference to FIG. 2.

In a low vehicle-speed range, the sideslip angle of a vehicle body or a tire is relatively smaller than that when the vehicle speed is high. At the same steering angle and lateral acceleration, the self-aligning torque received from a road surface is smaller in the low-vehicle speed range. When the self-aligning torque becomes about equal to or less than the friction in the steering mechanism, the steering wheel does not easily return to the neutral position. Consequently, the driver is required to intentionally perform an operation to return the steering wheel to the neutral position.

Specifically, returning force is small in vehicles in which a toe angle and a caster trail are small, and in vehicles fitted with tires having low rolling resistance. In addition, friction is high in vehicles in which contact pressure against components is set to be high to reduce rattling noise of the rack and pinion mechanism. Each of the foregoing serves as a factor in inhibiting the return of the steering wheel to the neutral position.

Regarding such issues, the return control is control in which a correction torque in the direction in which the steering wheel returns to the neutral position is further added to the assistance torque in the electric power steering system.

Hereafter, in the present specification, a direction in which the steering wheel moves away from the neutral position is referred to as a "turning direction." The direction in which the steering wheel moves towards the neutral position is referred to as a "returning direction." That is, the "returning/turning direction" is objectively defined based on a relationship between the steering wheel and the neutral position, regardless of the senses of the driver.

Steering in the turning direction and steering in the returning direction are respectively referred to as "turn steering" and "return steering." In addition, a speed at which the steering wheel returns to the neutral position as a result of the self-aligning torque and the return control, even without the driver actively performing an operation to return the steering wheel, is referred to as a "returning speed."

FIG. 2A is a conceptual diagram showing changes over time in the steering angle θ until the steering wheel returns to the neutral position (that is, steering angle θ=0 [deg]) after the turn steering, in a state in which the driver has their hands on the steering wheel. A long broken line R0 indicates an operation in a case in which the steering angle θ does not return to 0 [deg] as a result of friction, when the return control is not performed or when the output of the return control is insufficient and the returning speed is too slow.

Conversely, a short broken line R1 indicates an operation in which the steering wheel returns to the neutral position as a result of favorable return control. Because the returning speed is appropriate, the steering angle θ smoothly changes. In addition, a single-dot chain line R2 and a two-dot chain line R3 show examples of inappropriate return control. In an operation indicated by the single-dot chain line R2, the output of the return control is excessive and the returning speed is too fast. Consequently, steering is inhibited. In an operation indicated by the two-dot chain line R3, the returning speed is unstable. Consequently, the driver may experience discomfort. Therefore, in the return control, a control goal is to actualize the operation indicated by the short broken line R1 in which steering is not inhibited and the steering wheel returns at a natural speed that does not cause discomfort.

Figure 2B:
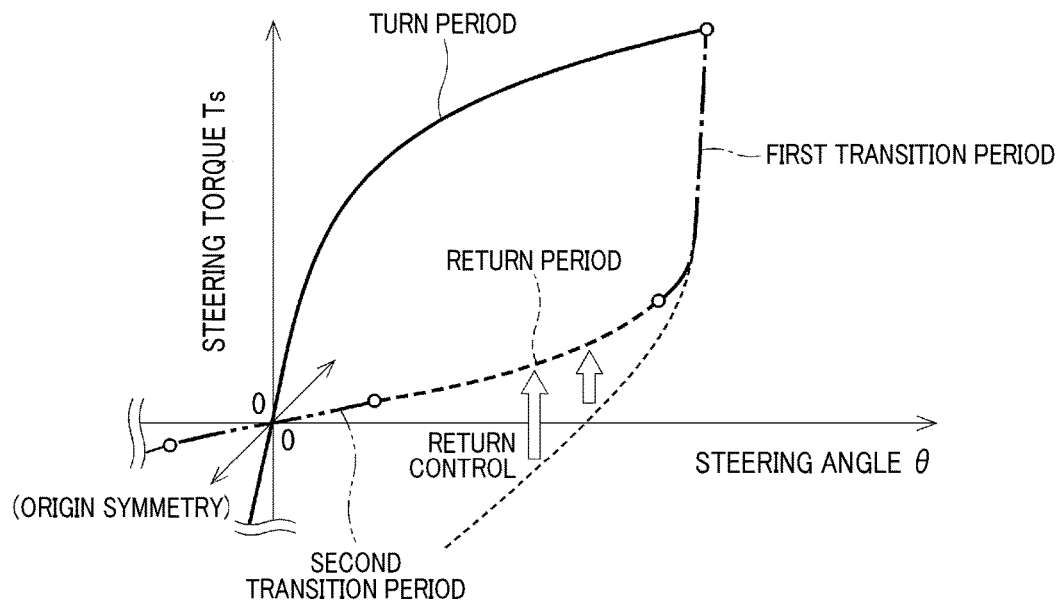

FIG. 2B is a diagram that expresses changes in state during transition from the turn steering to the return steering, based on a relationship between the steering angle θ and the steering torque Ts. Here, positive and negative signs of the steering angle θ are defined based on leftward and rightward directions with reference to the neutral position. In addition, signs of the steering torque Ts are defined based on the same directions as the directions indicated by the signs of the steering angle θ. Basically, when the steering torque Ts is applied in a positive direction, the steering angle θ changes to a positive direction. When the steering torque Ts is applied in a negative direction, the steering angle θ changes to a negative direction. FIG. 2B shows a diagram in which the steering angle θ and the steering torque Ts are both in the positive region. A diagram in which the steering angle θ and the steering torque Ts are both in the negative region will appear to be symmetrical to the diagram in FIG. 2B with respect to the origin.

The changes in state during the transition of steering are divided into four periods, that is, a "turn period" indicated by a solid line, a "first transition period" indicated by a single-dot chain line, a "return period" indicated by a broken line, and a "second transition period" indicated by a two-dot chain line. During the turn period in which the driver is turning the steering wheel, an absolute value of the steering angle θ increases. Curve shapes in FIG. 2B are merely an example. During the turn period, the return control is not performed so as not to inhibit steering. When the driver starts to return the steering wheel to the neutral position, the steering angle θ hardly changes. An absolute value of the steering speed ω is relatively small. During this first transition period, when the return control is actively performed, the driver experiences a strong returning sensation. Therefore, the return control is gradually started.

During the return period in which the driver is returning the steering wheel to the neutral position, the absolute value of the steering angle θ decreases. During the return period, the return control is actively performed. As a result, a curve expressed by a thin broken line that indicates "when the return control is not performed" is corrected such that the tip of the curve faces the point of origin. During the second transition period in which the steering wheel is near the neutral position, the absolute value of the steering angle θ gradually approaches zero over a relatively small range. The return control is gradually ended during this period.

In addition, respective steering states during the return period, the turn period, and the transition periods are referred to as a "returning state," a "turning state," and a "transitioning state." The returning state is defined as "a state in which the steering wheel position is changing towards the neutral position." The turning state is defined as "a state in which the steering wheel position is changing in the direction away from the neutral position." Information quantitatively expressing the returning state is a "return state quantity α" that is calculated by a returning state determining unit 50, described hereafter. The return state quantity α during each period in FIG. 2B is "α=0" during the turn period, "α=1" during the return period, and "0<α<1" during the first and second transition periods.

Japanese Patent Publication No. 4959217 discloses a related technology in which when a steering torque is applied by the driver such that a steering is held, a correction torque resulting from return control is prevented from being outputted. However, in this related technology, because the output of the return control is suppressed even when the driver actively applies the steering torque in the returning direction, a problem arises in that steering load placed on the driver increases.

With regard to this problem, the return control unit 13 according to the present embodiment includes a "driver steering correcting unit" to appropriately adjust the return control amount Tr* based on the steering by the driver during the return control. The driver steering correcting unit determines whether the steering torque Ts is applied in the returning direction or the turning direction. When determined that the steering torque is applied in the returning direction, the driver steering correcting unit prevents the return control amount Tr* from being suppressed.

Next, configurations of the return control unit 13 according to the first to fifth embodiments will be described in this order. As the reference number of the return control unit according to each embodiment, the number of the embodiment is added as a third digit that follows the number "13."

[Configuration of the Return Control Unit]

First Embodiment

An overall configuration of a return control unit 131 according to the first embodiment is shown in FIG. 3.

The return control unit 131 is largely configured by four blocks, that is, a target steering speed calculating unit 201, a return control amount calculating unit 301, a returning state determining unit 50, and a returning speed stabilization control unit 60. In simple terms, the functions of the four blocks are as follows: the target steering speed calculating unit 201 calculates a target steering speed ω* for when the steering wheel returns to the neutral position; the return control amount calculating unit 301 calculates a returning force command value for the returning force that returns the steering wheel to the neutral position; the returning state determining unit 50 determines whether the steering wheel is turning or returning; and the returning speed stabilization control unit 60 stabilizes the returning speed of the steering wheel.

The steering angle θ, the steering speed ω, and the steering torque Ts are inputted to the return control unit 131 as information quantities used for calculation in each block. Here, the steering angle θ corresponds to "steering wheel position-related information of which the value when a steering wheel is in a neutral position is 0 and the value is positive or negative based on a steering wheel position with reference to the neutral position."

In the overall configuration diagrams of the return control unit according to each embodiment shown in FIG. 3 and in other drawings, input of the steering angle θ is indicated by a single-dot chain line, input of the steering speed ω is indicated by a two-dot chain line, and input of the steering torque Ts is indicated by a solid line, taking into consideration visibility of the drawings. All calculation results outputted from these blocks are indicated by solid lines.

Among the four blocks, the configurations of the target steering speed calculating unit and the return control amount calculating unit differ between the first embodiment and the second to fifth embodiments, described hereafter. In addition, the driver steering correcting unit is included either of the target steering speed calculating unit and the return control amount calculating unit.

Hereafter, the target steering speed calculating unit according to each embodiment is differentiated by the number of the embodiment being added as a third digit that follows the number "20." The return control amount calculating unit is also similarly differentiated by the number of the embodiment being added as a third digit that follows the number "30." However, when the configuration is essentially identical to that according to a preceding embodiment, the reference number of the preceding embodiment is applicable.

In the return control unit 131 according to the first embodiment, the target steering speed calculating unit 201 includes a basic target steering speed calculating unit 21, a multiplier 23, and a driver steering correcting unit 401.

The basic target steering speed calculating unit 21 calculates a basic target steering speed ω*_0 based on the steering angle θ. The basic target steering speed ω*_0 is a basic value of the target steering speed when the steering wheel is returning to the neutral position. The multiplier 23 multiplies a correction gain K1 with the basic target steering speed ω*_0. The target steering speed ω* is thereby calculated. The correction gain K1 is calculated by the driver steering correcting unit 401. The target steering speed calculating unit 201 outputs the target steering speed ω* calculated in the foregoing manner. A detailed configuration of the driver steering correcting unit 401 is described hereafter.

In the present specification, terms headed by the word "basic" are used below regarding a plurality of types of calculation values. These terms indicate that the value is that before addition or multiplication of a correction amount, in relation to a calculation value that is finally outputted.

The return control amount calculating unit 301 includes a steering speed deviation calculating unit 31, a steering speed servo controller 32, a steering angle reference torque calculating unit 33, and an adder 37. The steering speed deviation calculating unit 31 calculates a deviation $\Delta\omega$ between the target steering speed $\omega^*$ and the steering speed $\omega$. The steering speed servo controller 32 performs servo control such that the steering speed deviation $\Delta\omega$ becomes 0, that is, the steering speed $\omega$ follows the target steering speed $\omega^*$. The steering speed servo controller 32 calculates a basic return control amount $Tr^*\_0$.

The steering angle reference torque calculating unit 33 calculates a steering reference torque $T\theta$ that is the returning force based on the steering angle $\theta$. The adder 37 adds the steering angle reference torque $T\theta$ to the basic return control amount $Tr^*\_0$. The return control amount $Tr^*$ is thereby calculated. The return control amount calculating unit 301 outputs the return control amount $Tr^*$ calculated in the foregoing manner.

Figure 4:
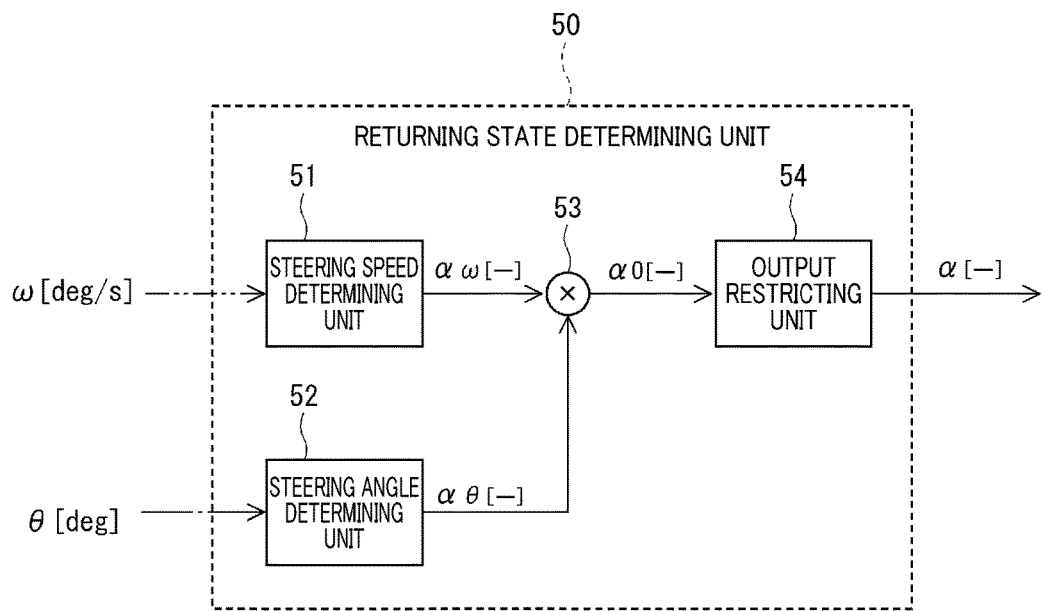
FIG. 4 is a control block diagram of a returning state determining unit.

As shown in FIG. 4, the return state determining unit 50 includes a steering speed determining unit 51, a steering angle determining unit 52, a multiplier 53, and an output restricting unit 54. State quantities $\alpha\omega$, $\alpha\theta$, $\alpha 0$, and $\alpha$ are each a dimensionless quantity [−].

The steering speed determining unit 51 calculates a speed state quantity $\alpha\omega$ that is a value ranging from −1 to +1, based on the steering speed $\omega$. The steering angle determining unit 52 calculates an angle state quantity $\alpha\theta$ that is a value ranging from −1 to +1, based on the steering angle $\theta$. The multiplier 53 multiplies the speed state quantity $\alpha\omega$ with the angle state quantity $\alpha\theta$. A pre-restriction return state quantity $\alpha 0$ that is a value ranging from −1 to +1 is calculated. The output restricting unit 54 eliminates negative values ranging from −1 to 0 of the pre-restriction return state quantity $\alpha 0$, and outputs only positive values ranging from 0 to +1 as a return state quantity $\alpha$.

The return state quantity $\alpha$ is used as an indicator for determining whether a current steering state is the return period, the turn period, or the transition period, shown in FIG. 2B.

The return speed stabilization control unit 60 calculates a return speed stabilization torque $T\omega\_stb$, based on the return state quantity $\alpha$ and the steering speed $\omega$. An adder 39 adds the return speed stabilization torque $T\omega\_stb$ to the return control amount $Tr^*$ outputted by the return control amount calculating unit 301. The return control amount final command value $Tr^{**}$ is thereby calculated.

According to the present embodiment, a detailed description of configurations related to the return state quantity $\alpha$ and the return speed stabilization torque $T\omega\_stb$ will be omitted.

Figure 5:
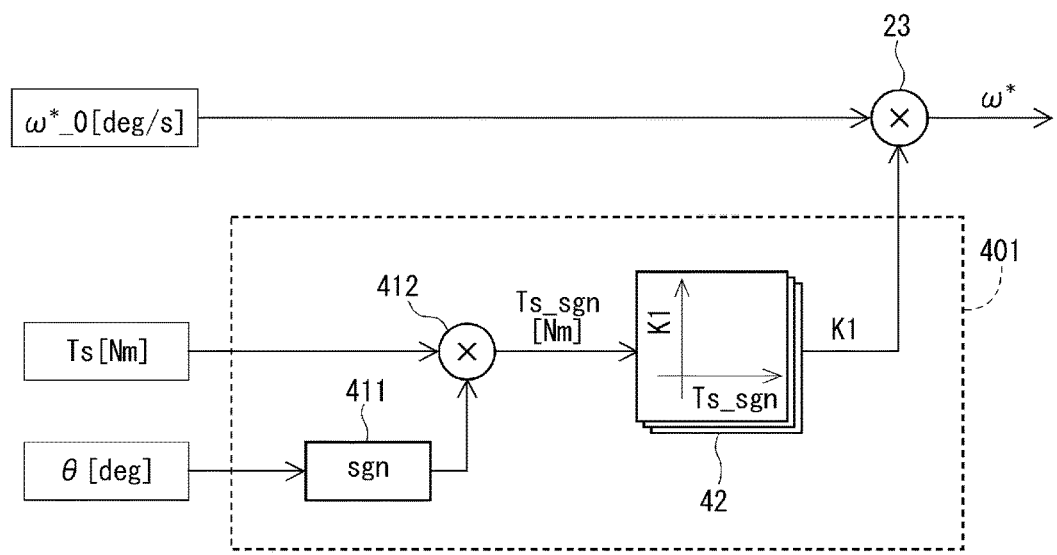
FIG. 5 is a control block diagram of a driver steering correcting unit according to the first embodiment.

Next, FIG. 5 shows a configuration of the driver steering correcting unit 401 according to the first embodiment. The driver steering correcting unit 401 has a sign determining unit ("sgn" in the drawings) 411, a sign multiplier 412, and a map 42. The sign determining unit 411 determines the sign of the steering angle $\theta$. The sign determining unit 411 calculates "+1" when the steering angle $\theta$ is positive and calculates "−1" when the steering angle $\theta$ is negative. When the steering angle $\theta$ is 0, the value may be an arbitrary value ranging from −1 to +1. The sign multiplier 412 multiplies the sign of the steering angle $\theta$ with the steering torque Ts. A post-sign multiplication steering torque Ts_sgn is calculated.

The map 42 prescribes a relationship between the post-sign multiplication steering torque Ts_sgn and the correction gain K1.

As described above, the multiplier 23 multiplies the correction gain K1 outputted by the driver steering correcting unit 401 with the basic target steering speed $\omega^*\_0$. The target steering speed $\omega^*$ thereby is calculated.

According to the first embodiment, a calculation quantity corresponding to "any calculation quantity in a calculation process for a return control amount," recited in the scope of claims, is the target steering speed $\omega^*$. According to the embodiments, the term "basic target steering speed $\omega^*\_0$" is differentiated from the "target steering speed $\omega^*$" for convenience. However, the "basic target steering speed $\omega^*\_0$" and the "target steering speed $\omega^*$" differ merely in terms of being values before and after correction, and essentially express the same subject. Therefore, the expression "outputted in relation to any calculation quantity" is interpreted to mean "outputted in relation to the basic target steering speed $\omega^*\_0$, and as a result, the target steering speed $\omega^*$ after correction is acquired." The "steering angle reference torque" and the "return control amount" according to the embodiments hereafter are also similarly interpreted.

In addition, according to the first embodiment, the correction gain K1 corresponds to "a correction amount outputted in relation to any calculation quantity." The reference number "K1" indicates that the correction gain is that according to the first embodiment. In a corresponding manner, the reference number of the correction gain according to the second embodiment is "K2."

Figure 6:
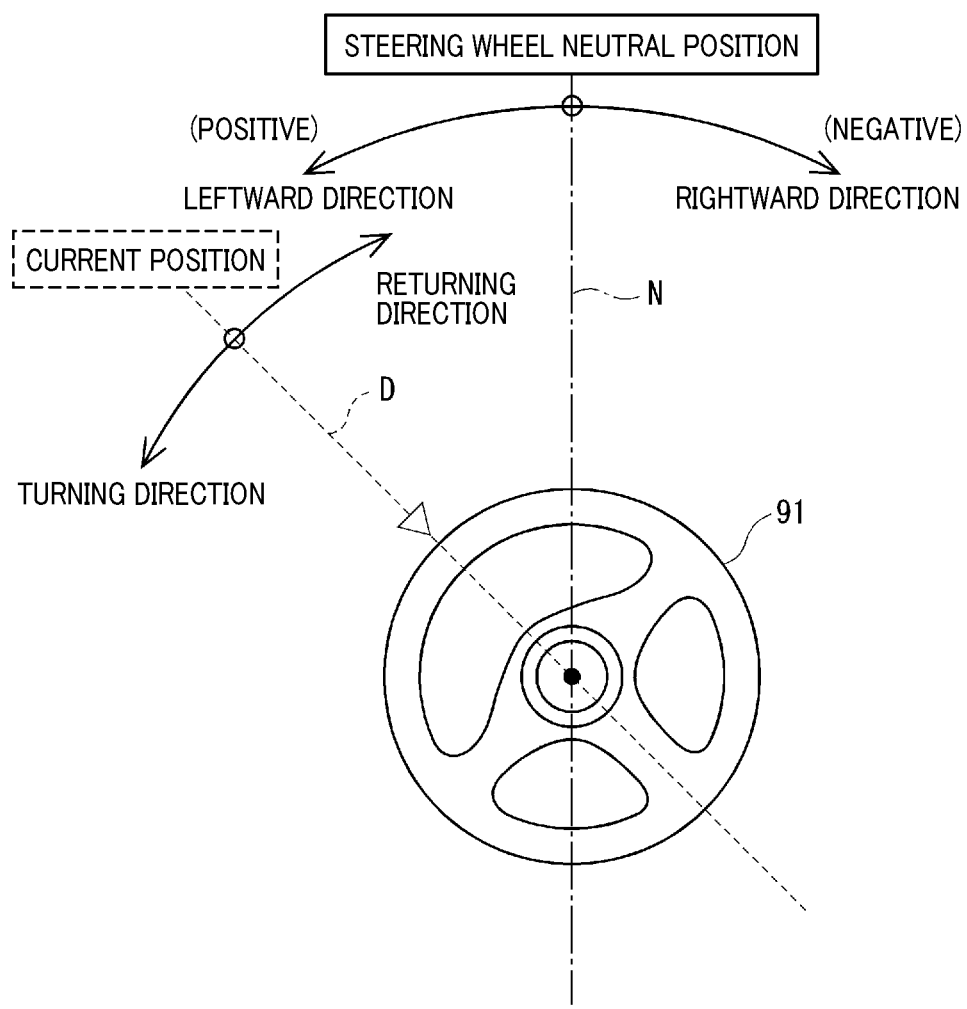
FIG. 6 is an explanatory diagram of definitions of positive and negative signs of the steering angle and steering torque.

Here, definitions of the signs of the steering angle $\theta$ and the steering torque Ts will be described with reference to FIG. 6. A direction of a single-dot chain line N in FIG. 6 indicates the neutral position of the steering wheel 91 (hereafter, the reference number 91 is omitted). A direction of a broken line D indicates a current steering wheel position. Regarding the steering angle $\theta$, the steering angle $\theta$ on the left side in relation to the neutral position is defined as being positive, and the steering angle $\theta$ on the right side in relation to the neutral position is defined as being negative. In addition, the steering speed $\omega$ and the steering torque Ts in a leftward rotation direction, that is, the counterclockwise direction are defined as being positive. The steering speed $\omega$ and the steering torque Ts in a rightward rotation direction, that is, the clockwise direction are defined as being negative.

According to another embodiment, conversely to the foregoing, the steering angle $\theta$ on the right side in relation to the neutral position, and the steering speed $\omega$ and the steering torque Ts in the rightward rotation direction may be defined as being positive. The steering angle $\theta$ on the left side in relation to the neutral position, and the steering speed $\omega$ and the steering torque Ts in the leftward rotation direction may be defined as being negative.

In addition, regarding the steering torque Ts, the direction merely indicates the direction in which the torque is applied, regardless of whether or not the steering wheel is actually rotating in this direction. For example, cases in which the steering wheel is stopped even when the steering torque Ts is being applied, such as due to road surface load or inertial torque, and cases in which the steering wheel is rotating in the direction opposite the steering torque Ts can be considered. Furthermore, as described above, the direction in which the steering wheel moves towards the neutral position is defined as the "returning direction." The direction in which the steering wheel moves away from the neutral position is defined as the "turning direction."

For example, when the steering angle θ is in the positive region, the torque is applied in the returning direction when the steering torque Ts is negative. The torque is applied in the turning direction when the steering torque Ts is positive. Meanwhile, when the steering angle θ is in the negative region, the torque is applied in the returning direction when the steering torque Ts is positive. The torque is applied in the turning direction when the steering torque Ts is negative.

In other words, the steering angle θ and the steering torque Ts having differing signs, and the post-sign multiplication steering torque Ts_sgn being negative indicates that the torque is being applied in the returning direction. The steering angle θ and the steering torque Ts having the same sign, and the post-sign multiplication steering torque Ts_sgn being positive indicates that the torque is being applied in the turning direction. Therefore, the post-sign multiplication steering torque Ts_sgn expresses both information on the absolute value of the steering torque Ts and information regarding whether the steering torque Ts is applied in the returning direction or the turning direction.

Figure 7:
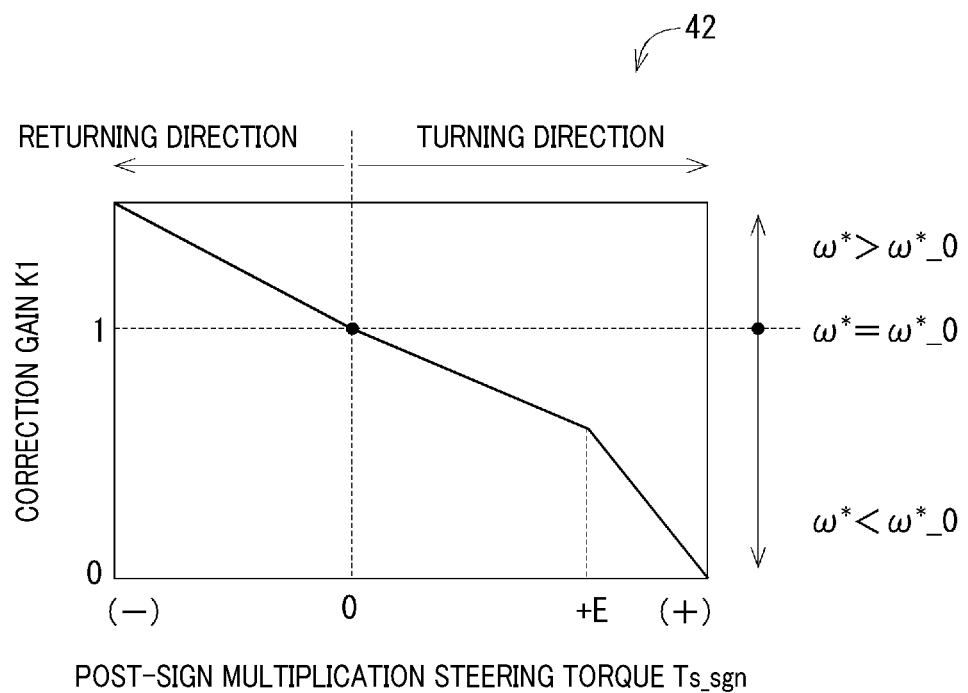
FIG. 7 is an example of a map in FIG. 5.

FIG. 7 shows an example of the map 42. The correction gain K1 is 1 when the post-sign multiplication steering torque Ts_sgn is 0. The target steering speed calculating unit 201 outputs the basic target steering speed ω*_0 as is, as the target steering speed ω*.

With reference to the foregoing, the correction gain K1 increases from 1 as the post-sign multiplication steering torque Ts_sgn decreases in the negative direction. The target steering speed ω* that is greater than the basic target steering speed ω*_0 is outputted. As a result, the return control amount Tr* calculated by the return control amount calculating unit 301 increases. Consequently, the assistance amount for the return control increases when the driver is applying the steering torque Ts in the returning direction. The steering load can be reduced.

Figure 12:
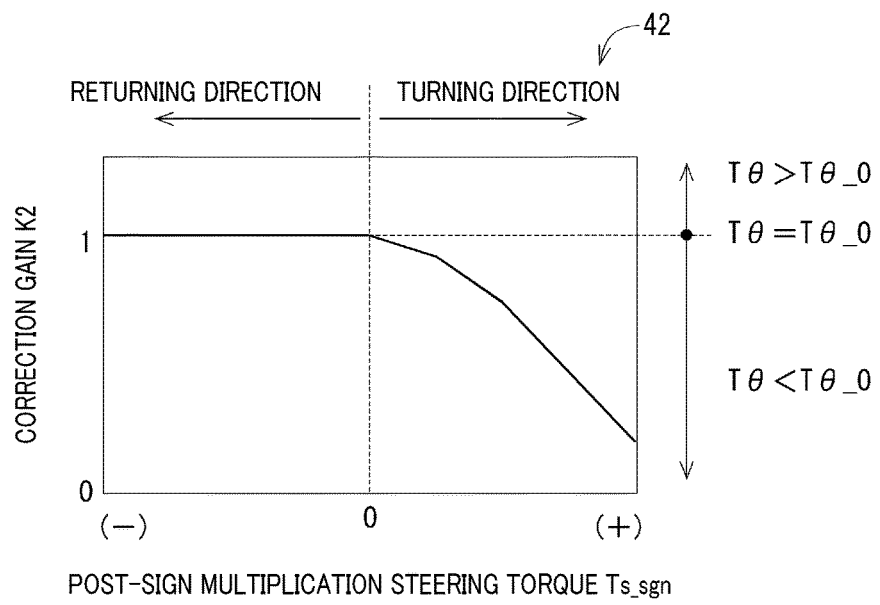
FIG. 12 is an example of a map in FIG. 11.

Based on the technical concept according to the present embodiment, all that is required is that there is at least no decrease in the return control amount Tr*, compared to when the driver steering correction is not performed, when the post-sign multiplication steering torque Ts_sgn is negative. That is, in addition to the return control amount Tr* being increased, the return control amount Tr* may be maintained. Therefore, as shown in FIG. 12 according to the second embodiment, for example, a map in which the correction gain is fixed at 1 in the negative region of the post-sign multiplication steering torque Ts_sgn may be used. In this case, at least increase in the steering load can be prevented.

In addition, the correction gain K1 decreases from 1 as the post-sign multiplication steering torque Ts_sgn increases in the positive direction. The target steering speed ω* that is lower than the basic target steering speed ω*_0 is outputted. As a result, the return control amount Tr* calculated by the return control amount calculating unit 301 decreases. Specifically, a change gradient of the correction gain K1 changes such as to increase towards the negative side in a region in which the post-sign multiplication steering torque Ts_sgn is equal to "+E" or greater, compared to that in a region in which the post-sign multiplication steering torque Ts_sgn is less than "+E."

As a result, the assistance amount for the return control decreases when the driver is applying the steering torque Ts in the turning direction. A sense of inhibited steering experienced by the driver, that is, discomfort in which the driver feels that the steering wheel is returning to the neutral position despite performing a turning operation can be reduced.

Here, with the above-described working effects as basis, detailed characteristics such as a tilt of the map, a torque value at which the tilt changes, and the like are preferably set to optimal characteristics based on vehicle speed V. Therefore, as indicated by the plurality of overlapping maps 42 in FIG. 5, a differing map may be used for each vehicle speed V. Alternatively, an optimal map may be selected based on a gain calculated from the vehicle speed V.

Next, actual apparatus data obtained by the return control including the driver steering correction according to the first embodiment being performed will be described with reference to FIGS. 8A to 8C, 9A, and 9B. A horizontal axis in each of FIGS. 8A to 8C, 9A, and 9B indicates a common time axis. A vertical axis in FIG. 8A indicates the steering angle θ. A vertical axis in FIG. 8B indicates the steering torque Ts. A vertical axis in FIG. 8C indicates the post-sign multiplication steering torque Ts_sgn. A vertical axis in FIG. 9A indicates the target steering speed ω* after multiplication by the correction gain K1. A vertical axis in FIG. 9B indicates the return control amount Tr*.

Figure 8A:
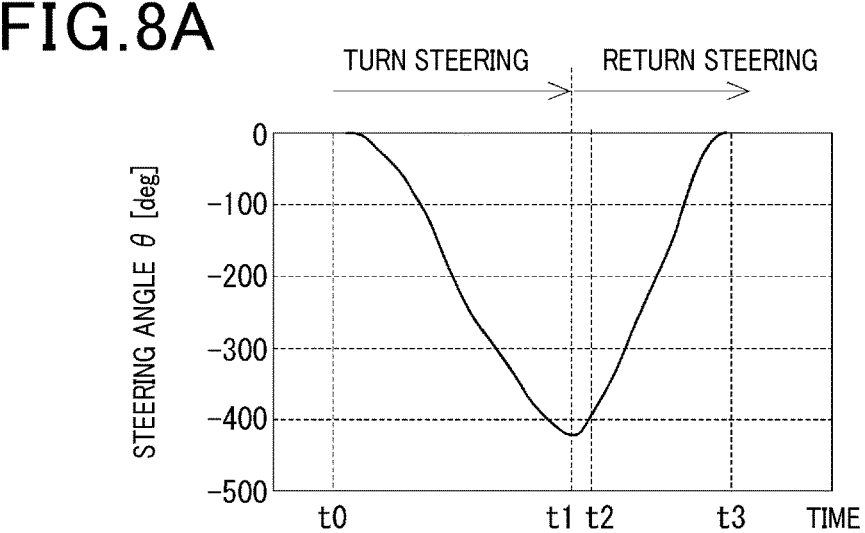
FIGS. 8A to 8C are actual apparatus data (1) indicating working effects of driver steering correction.
Figure 8B:
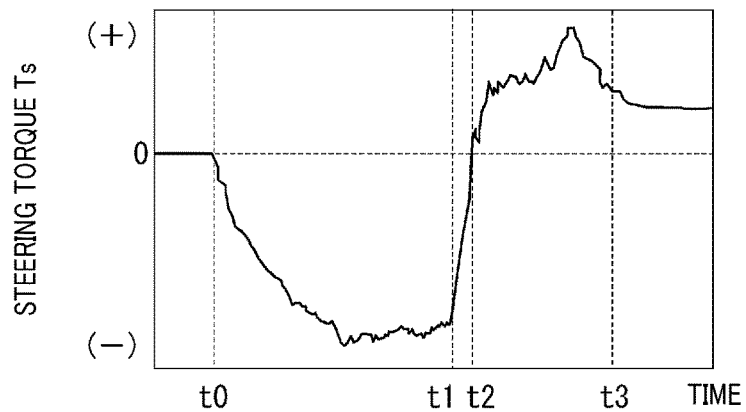
Figure 8C:
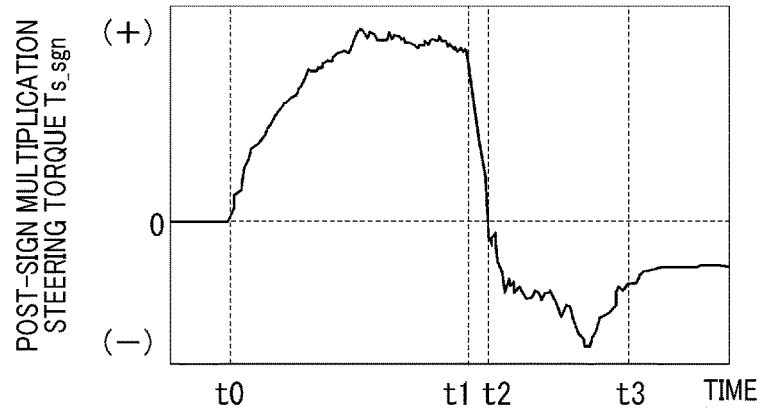

As shown in FIG. 8A, the actual apparatus data indicates the changes in the return control amount Tr* when, after steering is performed in the turning direction by about −400 [deg] from time t0 to time t1, steering is performed in the returning direction towards the neutral position, that is, 0 [deg] from time t1 to time t3. Specifically, the steering torque Ts is still applied in the negative direction during the period immediately after time t1 until time t2. The steering torque Ts becomes 0 at time t2. The sign of the steering angle θ is negative over the period from time t0 to time t3. Therefore, the post-sign multiplication steering torque Ts_sgn in FIG. 8C has a shape in which positive and negative is reversed in relation to the shape of the steering torque Ts in FIG. 8B.

Figure 9A:
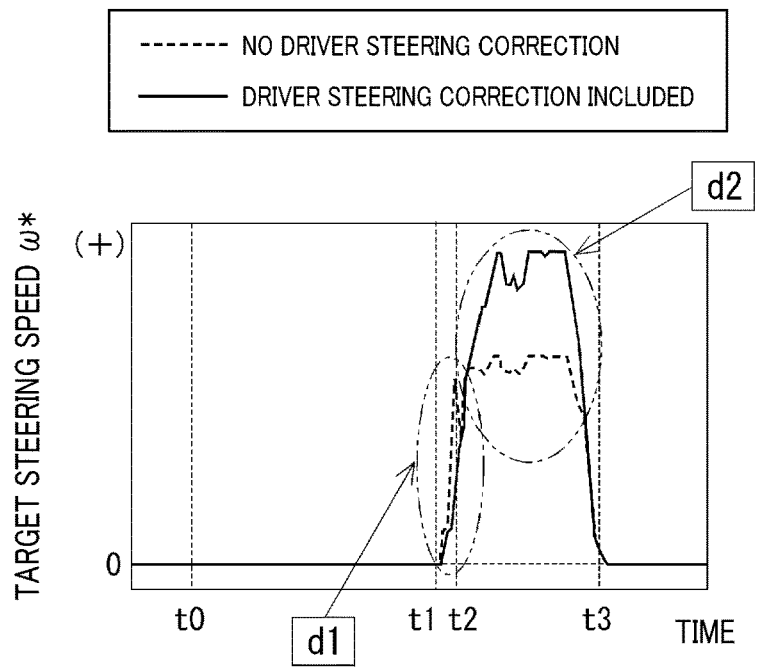
FIGS. 9A and 9B are actual apparatus data (2) indicating working effects of driver steering correction.
Figure 9B:
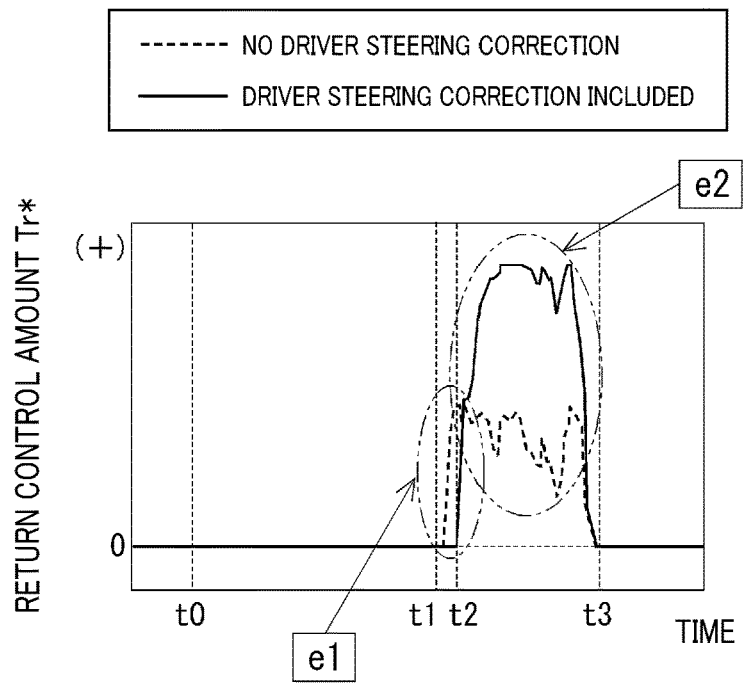

In FIGS. 9A and 9B, data obtained when the return control that does not include the driver steering correction is performed is indicated by a broken line for comparison. As shown in a d1 portion in FIG. 9A and an e1 portion in FIG. 9B, when the driver steering correction is included, the target steering speed ω* after multiplication by the correction gain K1 and the return control amount Tr* decrease during the period from time t1 to time t2, compared to when the driver steering correction is not included. In this way, as a result of the return control amount Tr* being reduced when the driver applies the steering torque Ts in the turning direction, the sense of inhibited steering is reduced.

As shown in a d2 portion in FIG. 9A and an e2 portion in FIG. 9B, when the driver steering correction is included, the target steering speed ω* after multiplication by the correction gain K1 and the return control amount Tr* increase during the period from time t2 to time t3, compared to when the driver steering correction is not included. In this way, as a result of the return control amount Tr* being increased when the driver applies the steering torque Ts in the returning direction, steering load is reduced.

In the related technology in Japanese Patent Publication No. 4959217, the output of the return control is suppressed even when the driver is applying the steering torque Ts in the returning direction. Therefore, the steering load placed on the driver increases. In this regard, according to the present embodiment, the return control amount Tr* is maintained or increased when the driver is applying the steering torque Ts in the returning direction, compared to when the driver steering correction is not performed. That is, the return control amount Tr* is at least not reduced. Therefore, the steering load can be reduced, and steering feel can be improved. Consequently, the steering control apparatus according to the present embodiment is capable of appropriately adjusting the return control amount based on steering by the driver.

In addition, when focus is placed on the operation immediately before time t3 to time t3, the return control amount Tr* gradually approaches 0 when the steering angle θ gradually approaches 0 [deg]. In the driver steering correction, multiplication by the sign of the steering angle θ is performed during calculation of the post-sign multiplication steering torque Ts_sgn. Therefore, unless the return control amount Tr* is a value near 0 when the steering angle θ is 0 [deg], a problem arises in that an outlier occurs in the output, or in other words, the output becomes discontinuous. Therefore, the driver steering correcting unit 401 gradually brings the return control amount Tr* closer to 0 when the steering angle θ gradually approaches 0 [deg]. As a result, continuity of the output can be ensured.

According to the second to fifth embodiments hereafter, other configurations in which the driver steering correcting unit is provided in the return control unit will be described. Configurations according to the second to fifth embodiments that are essentially identical to those according to the first embodiment are given the same reference numbers. Descriptions thereof are omitted. In particular, the configuration in which the post-sign multiplication steering torque Ts_sgn is calculated through multiplication of the sign of the steering angle θ and the steering torque Ts by the sign determining unit 411 and the sign multiplier 412 is commonly used in driver steering correcting units 402 to 405 according to the second to fifth embodiments.

The driver steering correcting unit according to each embodiment prevents increase in the steering load placed on the driver or reduces the steering load by maintaining or increasing the return control amount Tr* when steering in the returning direction, at which the post-sign multiplication steering torque Ts_sgn becomes negative, is performed. In addition, the driver steering correcting unit reduces the sense of inhibited steering experienced by the driver by reducing the return control amount Tr* when steering in the turning direction, at which the post-sign multiplication steering torque Ts_sgn becomes positive, is performed. In a manner similar to that according to the first embodiment, regarding the map according to each embodiment, a differing map for each vehicle speed V may be used. Alternatively, a map may be selected based on a gain calculated from the vehicle speed V.

Second Embodiment

A return control unit 132 according to the second embodiment will be described with reference to FIGS. 10 to 12.

Figure 10:
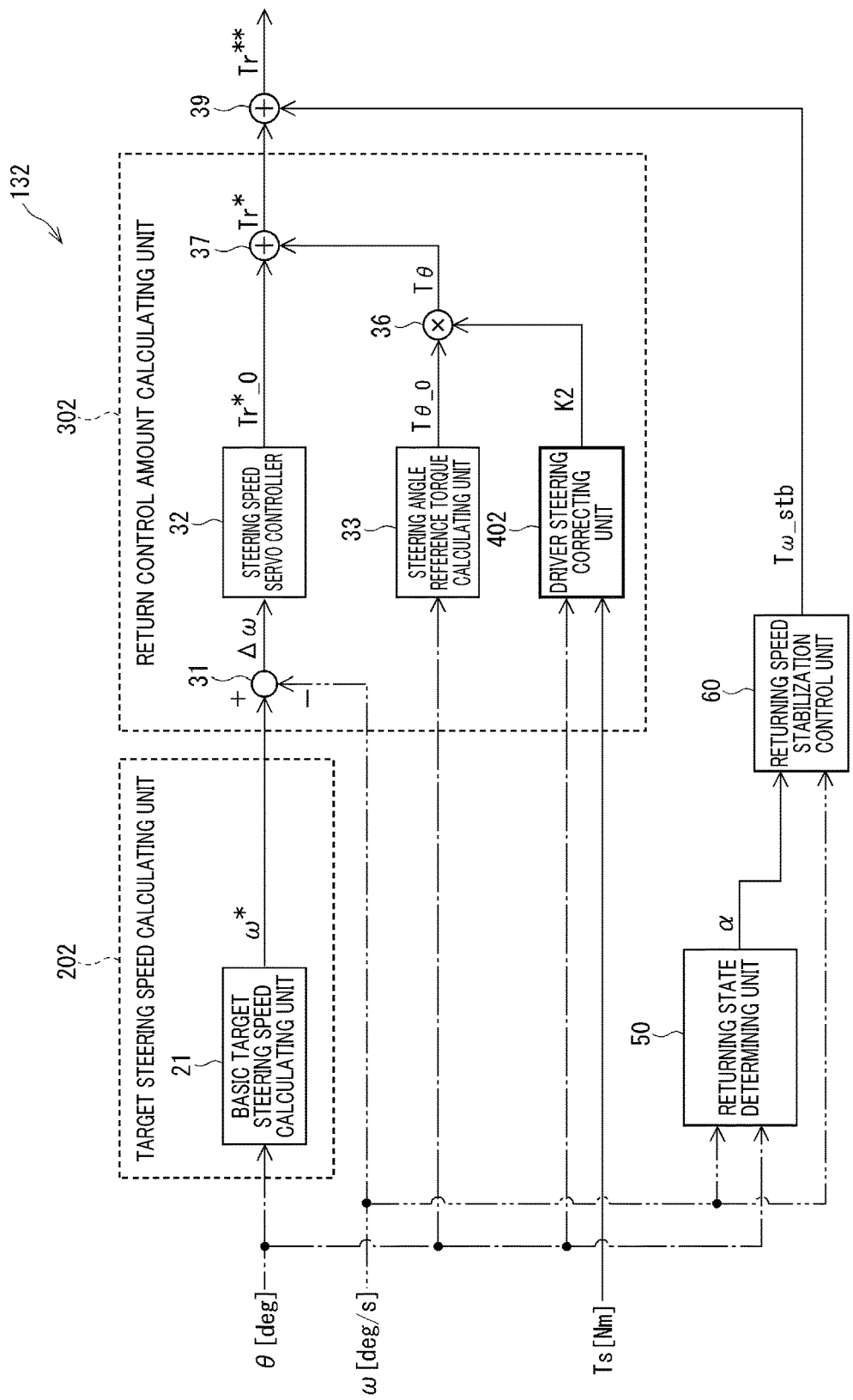
FIG. 10 is an overall control block diagram of a return control unit according to a second embodiment.

In the return control unit 132 according to the second embodiment shown in FIG. 10, the driver steering correcting unit 402 is provided in a return control amount calculating unit 302. The driver steering correcting unit 402 calculates the correction gain K2. A multiplier 36 multiplies the correction gain K2 outputted by the driver steering correcting unit 402 with a basic steering angle reference torque Tθ_0 outputted by the steering angle reference torque calculating unit 33. As a result, the steering reference torque Tθ is calculated. According to the second embodiment, the steering angle reference torque Tθ corresponds to "any calculation quantity in a calculation process for a return control amount." The correction gain K2 corresponds to a "correction amount."

Figure 11:
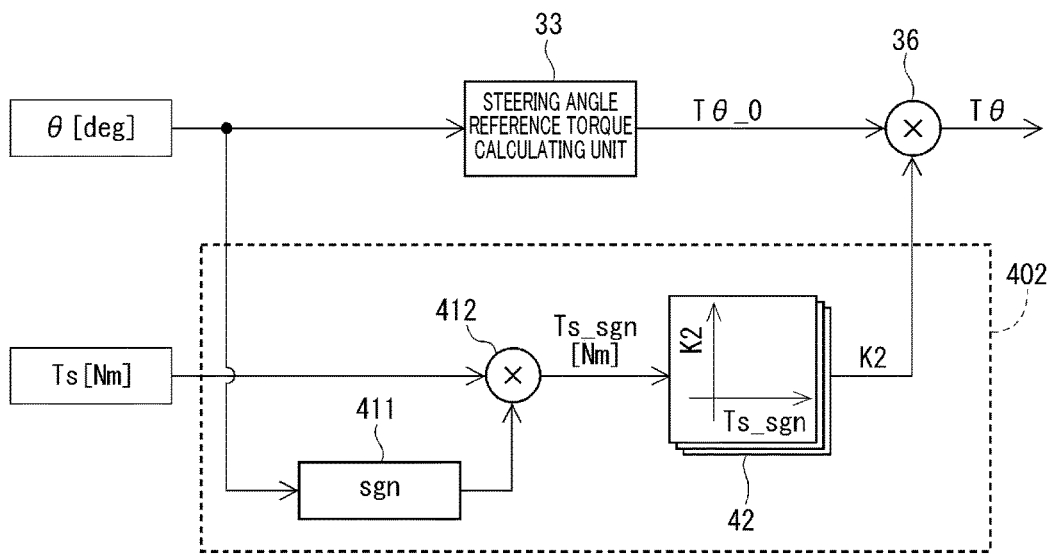
FIG. 11 is a control block diagram of a driver steering correcting unit according to the second embodiment.

As shown in FIG. 11, the driver steering correcting unit 402 has the map 42 that prescribes a relationship between the post-sign multiplication steering torque Ts_sgn and the correction gain K2. Regarding the map 42, the map 42 shown in FIG. 7 according to the first embodiment may be commonly used. Alternatively, as shown in FIG. 12, the correction gain K2 may be fixed at 1 in the negative region of the post-sign multiplication steering torque Ts_sgn. Regarding the second embodiment, Japanese Patent Publication No. 4959212 is referenced as related technology, in addition to Japanese Patent Publication No. 4959217.

A target steering speed calculating unit 202 that is shared among the second, third, and fourth embodiments differs from the target steering speed calculating unit 201 according to the first embodiment in that the target steering speed ω* calculated by the basic target steering speed calculating unit 21 is outputted as is. Therefore, it can be considered that the addition of "basic" to the "target steering speed calculating unit 21" is meaningless. However, the notation "basic" will remain in FIG. 10 and other drawings for the purpose of consistency with the first and fifth embodiments.

Third Embodiment

A return control unit 133 according to the third embodiment will be described with reference to FIGS. 13, 14, 15A, and 15B.

Figure 13:
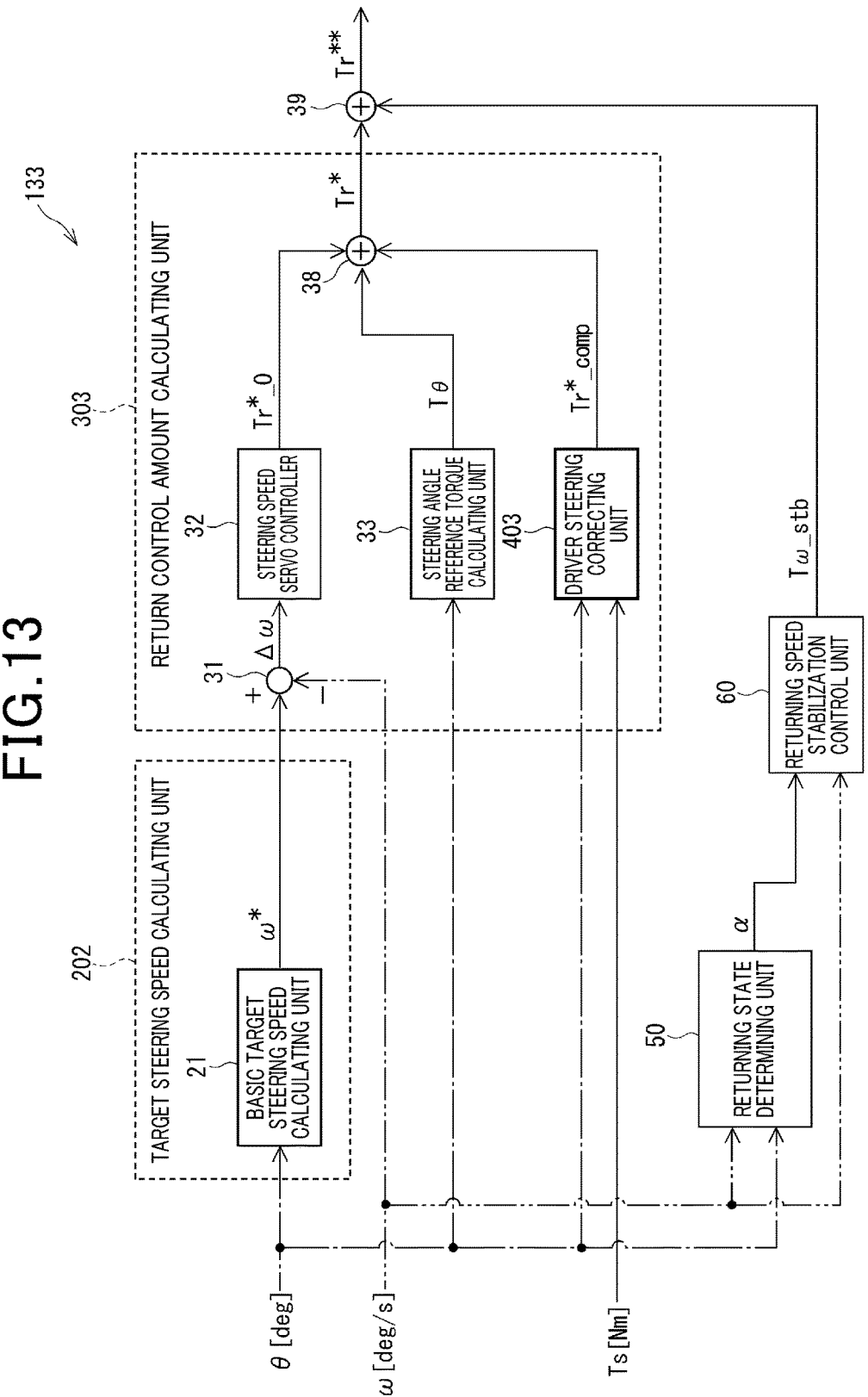
FIG. 13 is an overall control block diagram of a return control unit according to a third embodiment.

In the return control unit 133 according to the third embodiment shown in FIG. 13, a driver steering correcting unit 403 is provided in a return control amount calculating unit 303, in parallel with the steering angle reference torque calculating unit 33. The driver steering correcting unit 403 calculates a return control amount correction torque Tr*_comp. An adder 38 adds the return control amount correction torque Tr*_comp outputted by the driver steering correcting unit 403 and the steering angle reference torque Tθ outputted by the steering angle reference torque calculating unit 33 to the basic return control amount Tr*_0. As a result, the return control amount Tr* is calculated.

According to the third embodiment, the steering angle reference torque T0 and the return control amount Tr* correspond to "any calculation quantity in a calculation process for a return control amount." The return control amount correction torque Tr*_comp corresponds to a "correction amount."

Figure 14:
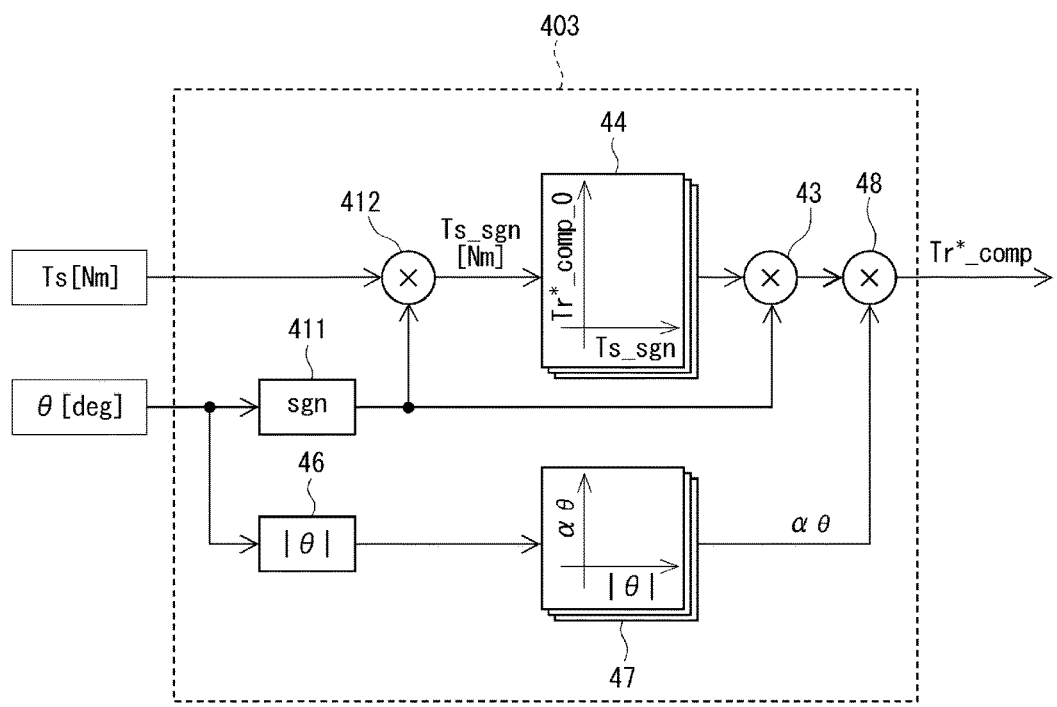
FIG. 14 is a control block diagram of a driver steering correcting unit according to the third embodiment.

As shown in FIG. 14, the driver steering correcting unit 403 has a first map 44 and a second map 47. The first map 44 prescribes a relationship between the post-sign multiplication steering torque Ts_sgn and a return control amount correction torque basic value Tr*_comp_0. In an example of the first map 44 shown in FIG. 15A, the return control amount correction torque basic value Tr*_comp_0 is set to 0 in the region in which the post-sign multiplication steering torque Ts_sgn is equal to or greater than the positive value "+E." The return control amount correction torque basic value Tr*_comp_0 is set to decrease at a substantially fixed tilt as the post-sign multiplication steering torque Ts_sgn decreases, in the negative region of the post-sign multiplication steering torque Ts_sgn and the positive region in which the post-sign multiplication steering torque Ts_sgn is less than "+E."

The second map 47 prescribes a relationship between an absolute value of the steering angle θ determined by an absolute value determining unit (|θ| in the drawings) 46 and the angle state quantity αθ that is a value ranging from 0 to 1. In an example of the second map 47 shown in FIG. 15B, the angle state quantity αθ is 0 when the steering angle θ is 0 [deg]. The angle state quantity αθ increases from 0 towards 1 as the absolute value of the steering angle θ increases. The angle state quantity $\alpha\theta$ substantially converges on 1 when the steering angle $\theta$ is about 60 [deg].

The sign of the return control amount correction torque basic value Tr*_comp_0 calculated in the first map 44 is adjusted as a result of a sign multiplier 43 multiplying the return control amount correction torque basic value Tr*_comp_0 with the sign of the steering angle $\theta$ determined by the sign determining unit 411. Furthermore, a multiplier 48 multiplies the torque after sign adjustment with the angle state quantity $\alpha\theta$ outputted by the second map 47. The return control amount correction torque Tr*_comp is calculated.

Figure 15A:
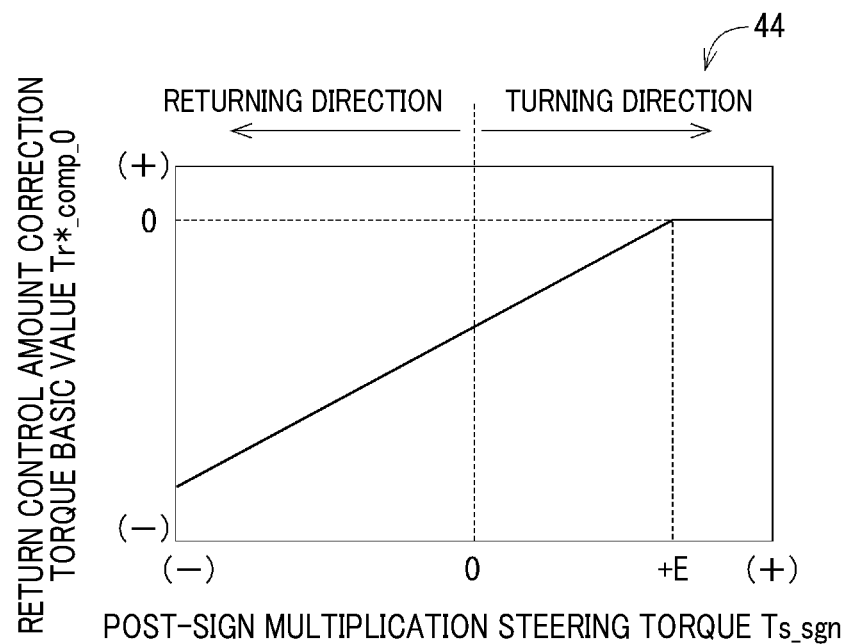
FIGS. 15A and 15B are examples of maps in FIG. 14.
Figure 15B:
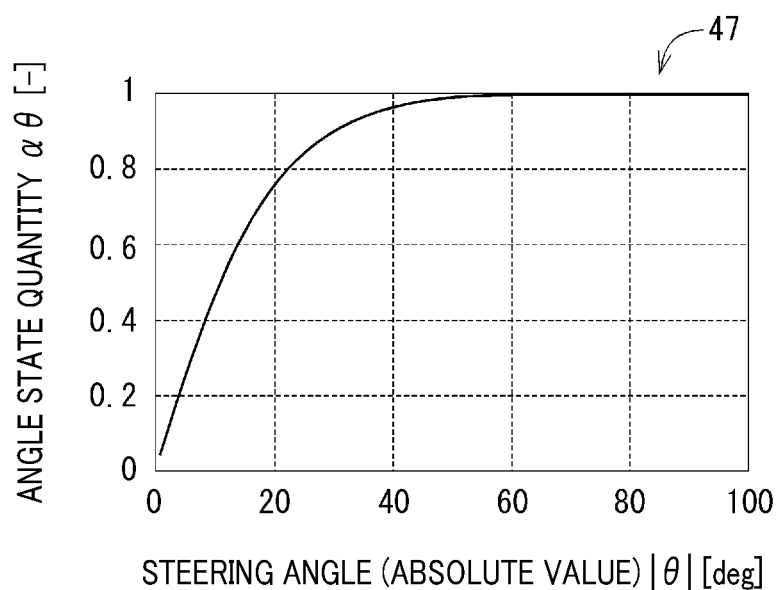

The driver steering correcting unit 403 uses the first map 44, such as that in FIG. 15A, to increases the return control amount correction torque Tr*_comp in the region in which the driver is applying the steering torque Ts in the returning direction. In addition, the driver steering correcting unit 403 uses the second map 47, such as that in FIG. 15B, to set the return control amount correction torque Tr*_comp to 0 when the steering wheel is near the neutral position.

Fourth Embodiment

A return control unit 134 according to the fourth embodiment will be described with reference to FIGS. 16 and 17.

Figure 16:
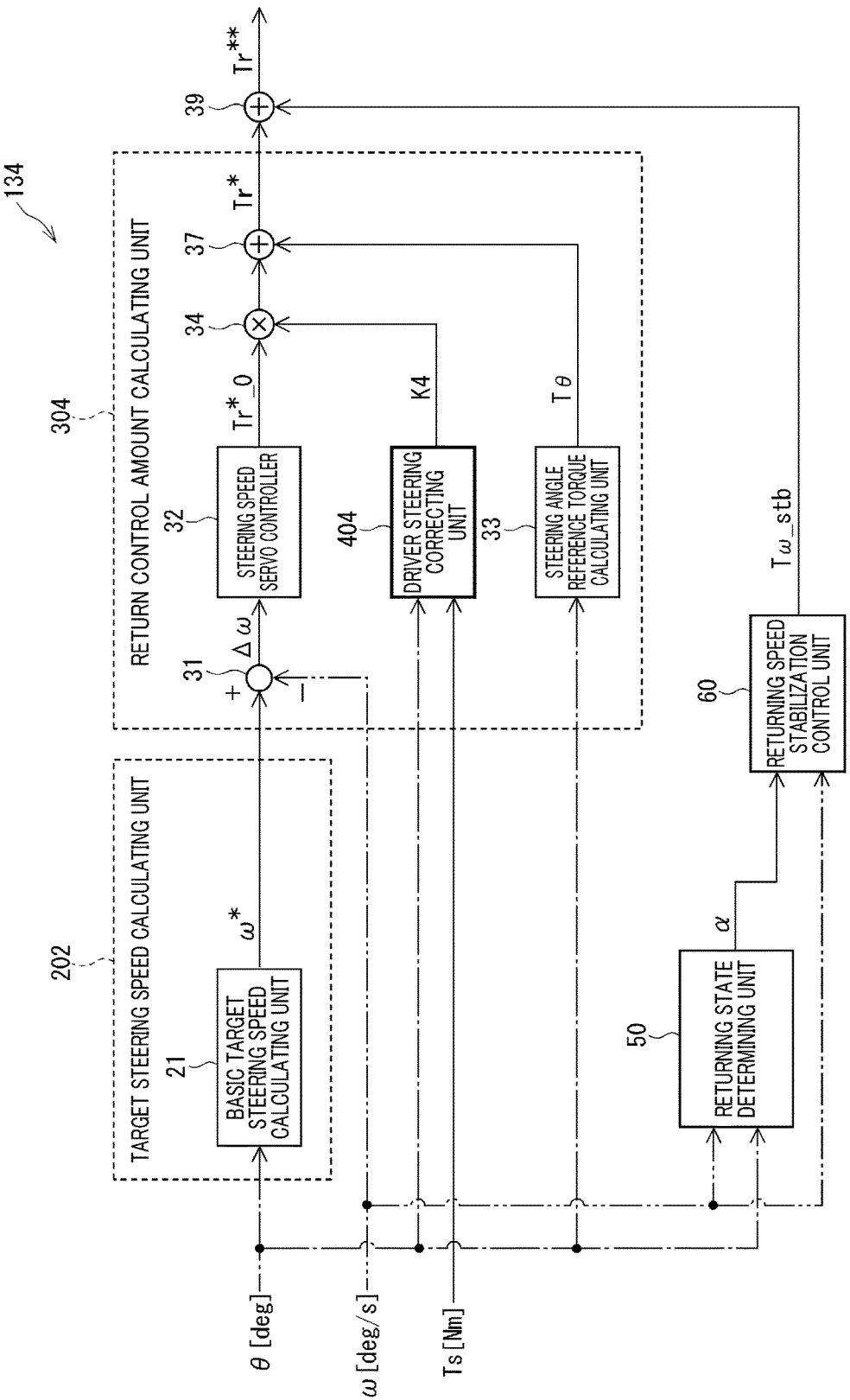
FIG. 16 is an overall control block diagram of a return control unit according to a fourth embodiment.

In the return control unit 134 according to the fourth embodiment shown in FIG. 16, a driver steering correcting unit 404 is provided in a return control amount calculating unit 304. The driver steering correcting unit 404 calculates a correction gain K4. A multiplier 34 multiplies the correction gain K4 outputted by the driver steering correcting unit 404 with the basic return control amount Tr*_0. The basic return control amount Tr*_0 is the value before the steering angle reference torque T$\theta$ is added. According to the fourth embodiment, the return control amount Tr* corresponds to "any calculation quantity in a calculation process for a return control amount." The correction gain K4 corresponds to a "correction amount."

Figure 17:
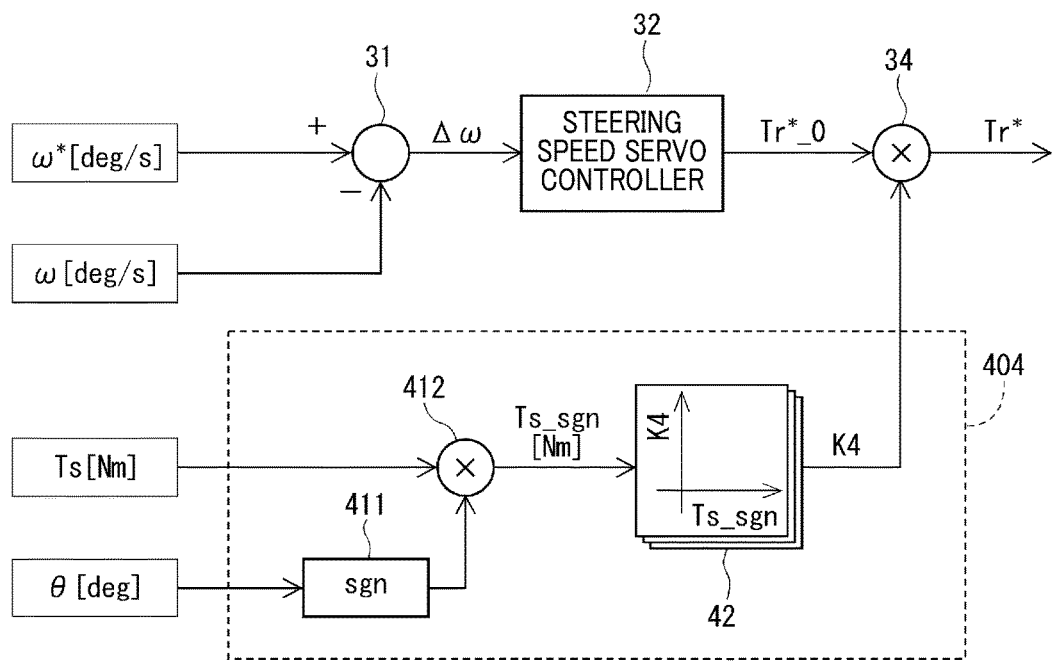
FIG. 17 is a control block diagram of a driver steering correcting unit according to the fourth embodiment.

As shown in FIG. 17, the driver steering correcting unit 404 has the map 42 that is essentially identical in format to the map 42 according to the first embodiment. The map 42 prescribes a relationship between the post-sign multiplication steering torque Ts_sgn and the correction gain K4. As a result, according to the fourth embodiment, the return control amount Tr* can be appropriately adjusted based on the post-sign multiplication steering torque Ts_sgn in a manner similar to that according to the first embodiment.

Furthermore, in addition to the configurations according to the first and fourth embodiments, the location at which multiplication by the correction gain based on the post-sign multiplication steering torque Ts_sgn is performed may be any location as long as the location enables increase and decrease in the return control amount Tr*. For example, the correction gain may be multiplied with the speed deviation $\Delta\omega$ between the target steering speed $\omega^*$ and the steering speed $\omega$ immediately before the steering speed servo controller 32.

Fifth Embodiment

A return control unit 135 according to the fifth embodiment will be described with reference to FIGS. 18 to 20.

Figure 18:
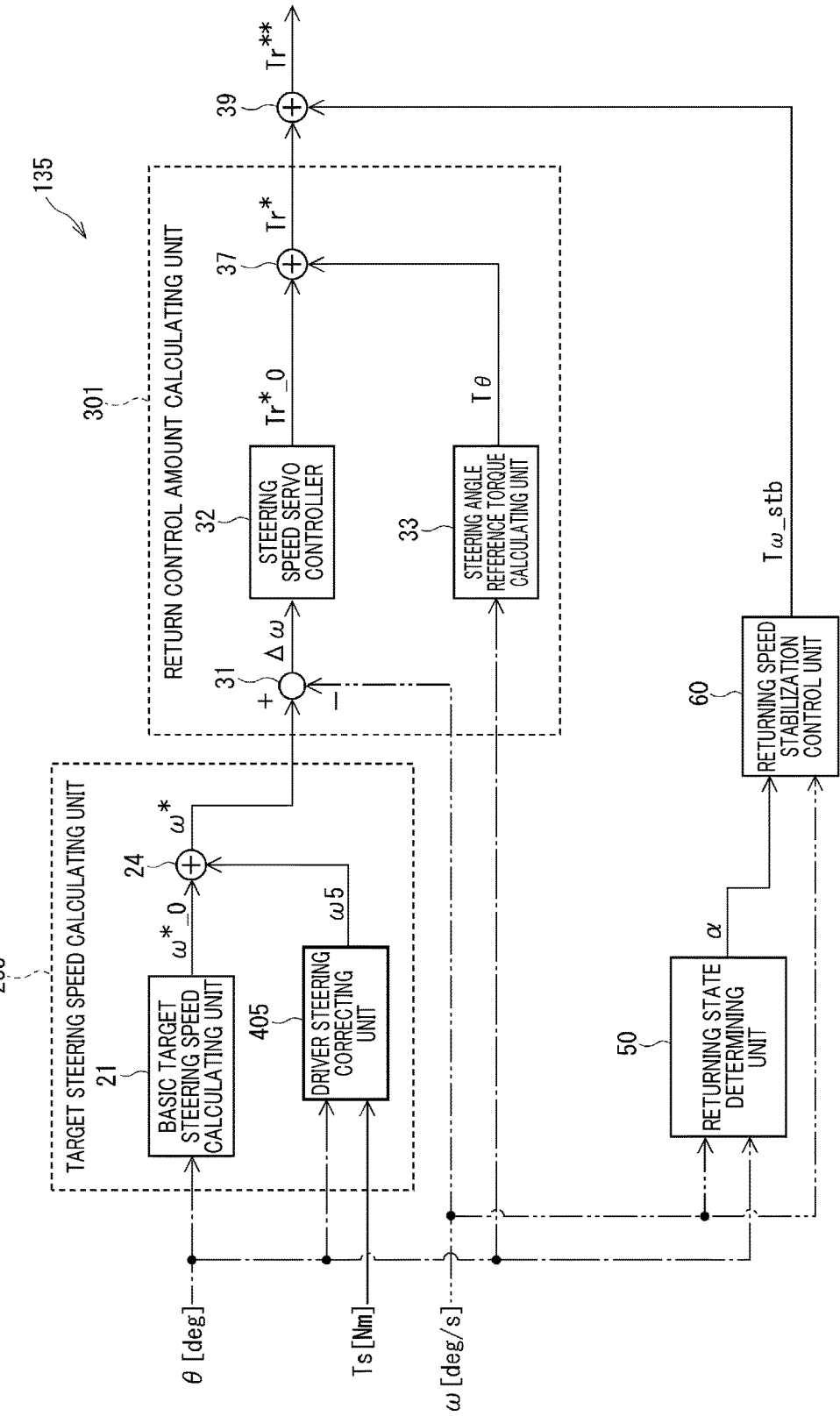
FIG. 18 is an overall control block diagram of a return control unit according to a fifth embodiment.

In the return control unit 135 according to the fifth embodiment shown in FIG. 18, a driver steering correcting unit 405 is provided in a target steering speed calculating unit 205. The driver steering correcting unit 405 calculates a correction target returning speed $\omega 5$. An adder 24 adds the correction target returning speed $\omega 5$ outputted by the driver steering correcting unit 405 to the basic target steering speed $\omega^*\_0$. According to the fifth embodiment, the target steering speed $\omega^*$ corresponds to "any calculation quantity in a calculation process for a return control amount." The correction target returning speed $\omega 5$ corresponds to a "correction amount."

Figure 19:
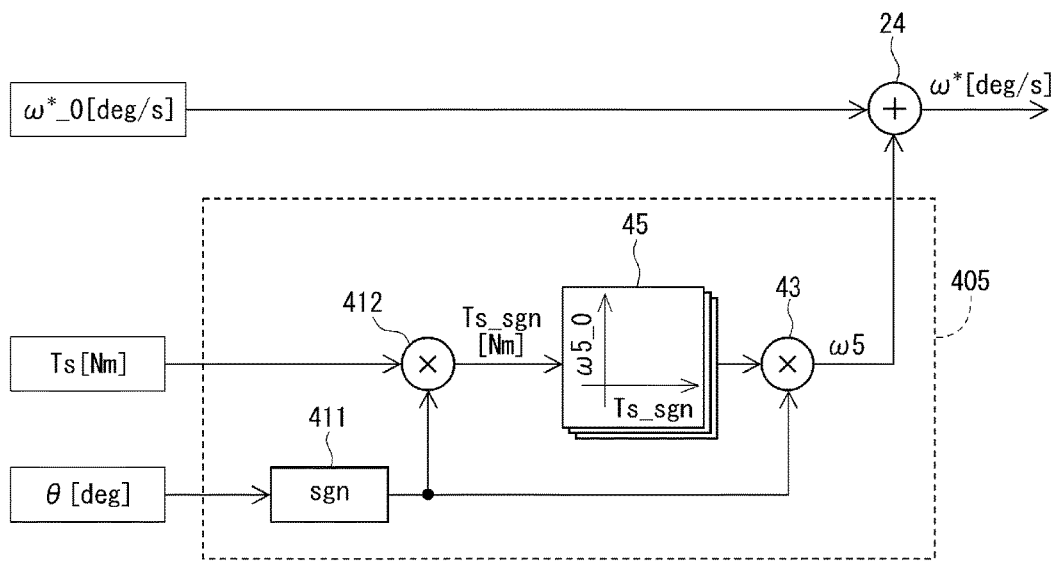
FIG. 19 is a control block diagram of a driver steering correcting unit according to the fifth embodiment.

As shown in FIG. 19, the driver steering correcting unit 405 has a map 45.

The map 45 prescribes a relationship between the post-sign multiplication steering torque Ts_sgn and a correction target returning speed basic value $\omega 5\_0$ before sign adjustment. In the example of the map 45 shown in FIG. 20, the relationship with the correction target returning speed basic value $\omega 5\_0$ is prescribed in five regions, I to V, of the post-sign multiplication steering torque Ts_sgn.

In the region I in which the post-sign multiplication steering torque Ts_sgn is less than a negative value "−A," the correction target returning speed basic value $\omega 5\_0$ is fixed at a negative lower-limit value "$-\omega 5_{LIM}$."

In the region II in which the post-sign multiplication steering torque Ts_sgn is equal to or greater than the negative value "−A" and less than a negative value "−B," the correction target returning speed basic value $\omega 5\_0$ increases from the lower-limit value "$-\omega 5_{LIM}$" to 0 based on the increase in the post-sign multiplication steering torque Ts_sgn.

In the region III in which the post-sign multiplication steering torque Ts_sgn is equal to or greater than the negative value "−B" and equal to or less than 0, and in the region IV in which the post-sign multiplication steering torque Ts_sgn exceeds 0 and is less than a positive value "+C," the correction target returning speed basic value $\omega 5\_0$ is fixed at 0.

In the region V in which the post-sign multiplication steering torque Ts_sgn is equal to or greater than the positive value "+C," the correction target returning speed basic value $\omega 5\_0$ increases from 0 based on the increase in the post-sign multiplication steering torque Ts_sgn.

In the region IV in this example, the return control amount Tr* that is the same value as that in the region III is maintained, even when the steering torque Ts is applied in the turning direction. In this way, because the effect on steering need not be considered in some cases when the absolute value of the steering torque Ts in the turning direction is small, the return control amount Tr* does not necessarily need to be reduced. The value "+C" of the steering torque Ts in this example is referred to as a "critical value."

Figure 20:
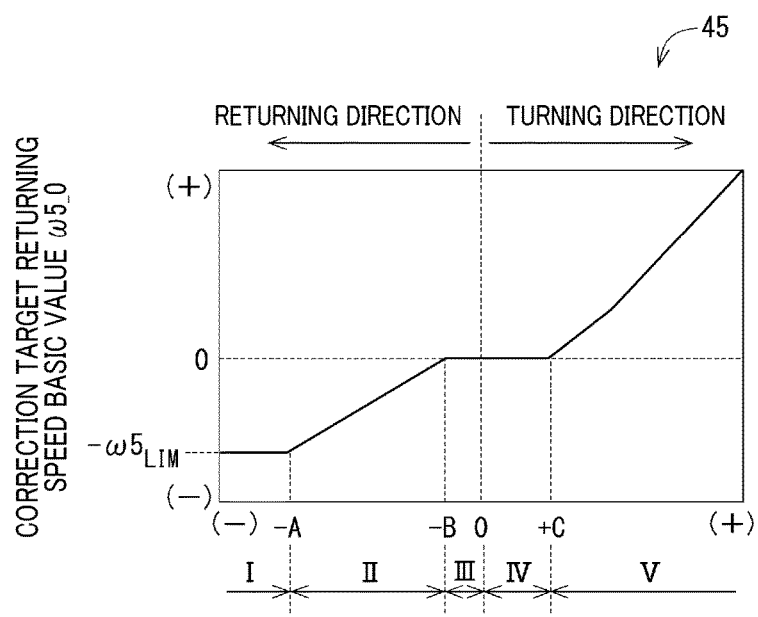
FIG. 20 is an example of a map in FIG. 19.

When the map shown in FIG. 20 is used, the driver steering correcting unit 405 calculates the correction target returning speed $\omega 5$ such as to reduce the return control amount Tr* when the steering torque Ts of which the absolute value is equal to or greater than the critical value is applied in the turning direction. When the maps in FIG. 7 and FIG. 12, described earlier, are used, the critical value is understood to be set to 0.

The sign multiplier 43 multiplies the correction target returning speed basic value $\omega 5\_0$ outputted by the map 45 with the sign of the steering angle $\theta$ determined by the sign determining unit 411. The correction target returning speed $\omega 5$ is calculated. The target steering speed calculating unit 205 outputs, to the return control amount calculating unit 301, the target steering speed $\omega^*$ after correction to which the correction target returning speed $\omega 5$ outputted by the driver steering correcting unit 405 has been added. The return control amount calculating unit 301 calculates the return control amount Tr* based on the target steering speed ω* after correction. As a result, the return control amount Tr* can be appropriately adjusted.

Other Embodiments (1) The steering angle θ used in control by the driver steering correcting units 401 to 405 according to the above-described embodiments is a typical example of "steering wheel position-related information" of which the value when the steering wheel is in the neutral position is 0 and the value is positive or negative based on the steering wheel position with reference to the neutral position. According to another embodiment, information such as a motor rotation angle, a rotation angle of a transmission system gear, a steering angle of a tire, or a yaw rate that is correlated with the steering angle θ may be used as the entirety or a portion of the steering wheel position-related information. In this case, the steering angle θ in the block diagrams and the maps according to the above-described embodiments may be replaced by another type of steering wheel position-related information, as appropriate.

(2) According to the above-described embodiments, the signs of the steering torque Ts are defined based on the same directions as the directions indicated by the signs of the steering angle θ. The post-sign multiplication steering torque Ts_sgn is calculated based on this definition. The driver steering correcting unit calculates the correction amount such as to maintain or increases the return control amount Tr* when the post-sign multiplication steering torque Ts_sgn is negative, and reduce the return control amount Tr* when the post-sign multiplication steering torque Ts_sgn is positive and the absolute value thereof is equal to or greater than the critical value.

According to another embodiment, the signs of the steering torque Ts may be defined based on directions opposite the directions indicated by the signs of the steering angle θ. The post-sign multiplication steering torque Ts_sgn may be calculated based on this definition. In this case, the driver steering correcting unit calculates the correction amount such as to maintain or increases the return control amount Tr* when the post-sign multiplication steering torque Ts_sgn is positive, and reduce the return control amount Tr* when the post-sign multiplication steering torque Ts_sgn is negative and the absolute value thereof is equal to or greater than the critical value.

(3) According to the above-described embodiments, the maps are used for calculation of the correction amount in the driver steering calculating units 401 to 405. However, calculation of the correction amount is not limited to the method in which a map is used. The correction amount may be calculated by a mathematical formula.

(4) In the control block diagrams according to each embodiment, configurations other than the driver steering correcting unit may be eliminated or changed as appropriate. For example, the returning state determining unit 50 or the returning speed stabilization control unit 60 may not be provided. Alternatively, a different type of correction control may be added.

The present disclosure is not limited in any way by the above-described embodiments. Various embodiments are possible without departing from the spirit of the present disclosure.

What is claimed is:

1. A steering control apparatus that controls an assistance torque outputted by a steering assistance motor based on a steering torque applied by a driver, the steering control apparatus comprising:

a basic assistance torque calculating unit that calculates, using a processor, a basic assistance torque; and
   a return control unit that calculates, using the processor, a return control amount for providing assistance such that a steering wheel returns to a neutral position, as a correction torque to be added to the basic assistance torque, wherein
   the return control unit includes
      a driver steering correcting unit that calculates, using the processor, a correction amount outputted in relation to any calculation quantity in a calculation process for the return control amount, based on the steering torque and steering wheel position-related information, such that the return control amount is maintained or increased in response to the steering torque being applied in a returning direction towards the neutral position of the steering wheel, and the return control amount is reduced in response to the steering torque of which an absolute value is equal to or greater than a predetermined critical value being applied in a turning direction away from the neutral position of the steering wheel, the steering wheel position-related information being information of which a value at which the steering wheel is at the neutral position is zero and the value is positive or negative based on a steering wheel position in relation to the neutral position.

2. The steering control apparatus according to claim 1, wherein:
   the driver steering correcting unit, based on a post-sign multiplication steering torque obtained by a sign of the steering wheel position-related information and the steering torque being multiplied, and with reference to the return control amount at which the post-sign multiplication steering torque is zero, calculates the correction amount, in response to signs of the steering torque being defined based on directions that are same as directions indicated by signs of the steering wheel position-related information, such that the return control amount is maintained or increased in response to the post-sign multiplication steering torque being negative, and the return control amount is reduced in response to the post-sign multiplication steering torque being positive and the absolute value thereof being equal to or greater than the critical value, and
   calculates the correction amount, in response to the signs of the steering torque being defined based on directions that are opposite the directions indicated by the signs of the steering wheel position-related information, such that the return control amount is maintained or increased in response to the post-sign multiplication steering torque being positive, and the return control amount is reduced in response to the post-sign multiplication steering torque being negative and the absolute value thereof being equal to or greater than the critical value.

3. The steering control apparatus according to claim 2, wherein:
   the driver steering correcting unit gradually brings the return control amount closer to zero in response to the steering wheel position-related information gradually approaching zero.

4. The steering control apparatus according to claim 3, wherein:

the return control unit includes a target steering speed calculating unit that calculates, using the processor, a target steering speed that is a target value for a steering speed; and the driver steering correcting unit performs multiplication or addition of the correction amount calculated based on the post-sign multiplication steering torque to the target steering speed.

5. The steering control apparatus according to claim 3, wherein:

the return control unit includes a steering angle reference torque calculating unit that calculates, using the processor, a steering angle reference torque based on a steering angle, and the driver steering correcting unit performs multiplication or addition of the correction amount calculated based on the post-sign multiplication steering torque to the steering angle reference torque.

6. The steering control apparatus according to claim 2, wherein:

the return control unit includes a target steering speed calculating unit that calculates, using the processor, a target steering speed that is a target value for a steering speed; and the driver steering correcting unit performs multiplication or addition of the correction amount calculated based on the post-sign multiplication steering torque to the target steering speed.

7. The steering control apparatus according to claim 2, wherein:

the return control unit includes a steering angle reference torque calculating unit that calculates, using the processor, a steering angle reference torque based on a steering angle, and the driver steering correcting unit performs multiplication or addition of the correction amount calculated based on the post-sign multiplication steering torque to the steering angle reference torque.

8. A method for controlling an assistance torque outputted by a steering assistance motor based on a steering torque applied by a driver, the method comprising:

calculating a basic assistance torque;

calculating a return control amount for providing assistance such that a steering wheel returns to a neutral position, as a correction torque to be added to the basic assistance torque; and calculating a correction amount outputted in relation to any calculation quantity in a calculation process for the return control amount, based on the steering torque and steering wheel position-related information, such that the return control amount is maintained or increased in response to the steering torque being applied in a returning direction towards the neutral position of the steering wheel, and the return control amount is reduced in response to the steering torque of which an absolute value is equal to or greater than a predetermined critical value being applied in a turning direction away from the neutral position of the steering wheel, the steering wheel position-related information being information of which a value at which the steering wheel is at the neutral position is zero and the value is positive or negative based on a steering wheel position in relation to the neutral position.

9. The method according to claim 8, further comprising:

calculating the correction amount, based on a post-sign multiplication steering torque obtained by a sign of the steering wheel position-related information and the steering torque being multiplied, and with reference to the return control amount at which the post-sign multiplication steering torque is zero, in response to signs of the steering torque being defined based on directions that are same as directions indicated by signs of the steering wheel position-related information, such that the return control amount is maintained or increased in response to the post-sign multiplication steering torque being negative, and the return control amount is reduced in response to the post-sign multiplication steering torque being positive and the absolute value thereof being equal to or greater than the critical value; and calculating the correction amount, in response to the signs of the steering torque being defined based on directions that are opposite the directions indicated by the signs of the steering wheel position-related information, such that the return control amount is maintained or increased in response to the post-sign multiplication steering torque being positive, and the return control amount is reduced in response to the post-sign multiplication steering torque being negative and the absolute value thereof being equal to or greater than the critical value.

10. The method according to claim 9, further comprising:

gradually setting the return control amount closer to zero in response to the steering wheel position-related information gradually approaching zero.

11. The method according to claim 10, further comprising:

calculating a target steering speed that is a target value for a steering speed; and multiplying or adding the correction amount calculated based on the post-sign multiplication steering torque to the target steering speed.

12. The method according to claim 10, further comprising:

calculating a steering angle reference torque based on a steering angle; and multiplying or adding the correction amount calculated based on the post-sign multiplication steering torque to the steering angle reference torque.

13. The method according to claim 9, further comprising:

calculating a target steering speed that is a target value for a steering speed; and multiplying or adding the correction amount calculated based on the post-sign multiplication steering torque to the target steering speed.

14. The method according to claim 9, further comprising:

calculating a steering angle reference torque based on a steering angle; and multiplying or adding the correction amount calculated based on the post-sign multiplication steering torque to the steering angle reference torque.

* * * * *